(12) United States Patent
Zhou et al.

(10) Patent No.: US 12,119,972 B2
(45) Date of Patent: Oct. 15, 2024

(54) SIGNAL TRANSMISSION METHOD BASED ON SATELLITE COMMUNICATION AND DEVICE

(71) Applicant: HUAWEI TECHNOLOGIES CO., LTD., Guangdong (CN)

(72) Inventors: Jianwei Zhou, Hangzhou (CN); Chenlei Xu, Hangzhou (CN); Hejia Luo, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 306 days.

(21) Appl. No.: 17/706,291

(22) Filed: Mar. 28, 2022

(65) Prior Publication Data

US 2022/0217033 A1 Jul. 7, 2022

Related U.S. Application Data

(63) Continuation of application No. PCT/CN2020/113827, filed on Sep. 7, 2020.

(30) Foreign Application Priority Data

Sep. 29, 2019 (CN) .......................... 201910936092.7

(51) Int. Cl.
*H04L 27/26* (2006.01)
*H04W 16/28* (2009.01)
*H04W 84/06* (2009.01)

(52) U.S. Cl.
CPC .... *H04L 27/26025* (2021.01); *H04L 27/2607* (2013.01); *H04W 16/28* (2013.01); *H04W 84/06* (2013.01)

(58) Field of Classification Search
CPC .............. H04B 7/1851; H04B 7/18519; H04B 7/18532; H04L 27/2602; H04L 27/26025;
(Continued)

(56) References Cited

U.S. PATENT DOCUMENTS

2016/0294521 A1 10/2016 Au et al.
2018/0352527 A1 12/2018 Wang et al.
2019/0253183 A1 8/2019 Hao et al.

FOREIGN PATENT DOCUMENTS

CN 101056151 A 10/2007
CN 101674163 A 3/2010
(Continued)

OTHER PUBLICATIONS

NR-NTN: Analysis of the applicability of NR numerology to satellite communication 3GPP RP-172277_NR; Dec. 17, 2017 (Year: 2017).*
(Continued)

*Primary Examiner* — Pankaj Kumar
*Assistant Examiner* — Natali Pascual Peguero
(74) *Attorney, Agent, or Firm* — Fish & Richardson P.C.

(57) ABSTRACT

Example signal transmission methods based on satellite communication and apparatus are described. One example method includes: obtaining, by a communication device, carrier attribute information corresponding to a target carrier used to transmit an orthogonal frequency division multiplexing (OFDM) symbol. The carrier attribute information of the target carrier includes subcarrier spacing. The communications device determines a cyclic prefix (CP) length of the OFDM symbol based on the carrier attribute information of the target carrier and a preset correspondence between carrier attribute information and the OFDM symbol. The CP is used to carry first data. The first data is data in the OFDM symbol.

15 Claims, 10 Drawing Sheets

(58) Field of Classification Search
CPC ............... H04L 27/2607; H04L 27/261; H04L 27/2646; H04L 27/2666; H04L 27/2695; H04L 5/0048; H04L 27/2663; H04W 16/28; H04W 84/06
See application file for complete search history.

(56) References Cited

FOREIGN PATENT DOCUMENTS

| | | |
|---|---|---|
| CN | 106063353 A | 10/2016 |
| CN | 107154907 A | 9/2017 |
| CN | 107733831 A | 2/2018 |
| CN | 108023703 A | 5/2018 |
| CN | 109155773 A | 1/2019 |
| JP | 2008510419 A | 4/2008 |
| JP | 2010093799 A | 4/2010 |
| WO | 2016068072 A1 | 5/2016 |
| WO | 2018028621 A1 | 2/2018 |
| WO | 2018223088 A1 | 12/2018 |
| WO | 2019097922 A1 | 5/2019 |

OTHER PUBLICATIONS

3GPP TR 38.811 V15.1.0 (2019-06), "3rd Generation Partnership Project; Technical Specification Group Radio Access Network; Study on New Radio (NR) to support non-terrestrial networks (Release 15)," Jun. 2019, 47 pages.

Office Action issued in Chinese Application No. 201910936092.7 on May 7, 2022, 8 pages (with English translation).

Office Action issued in Chinese Application No. 201910936092.7 on Nov. 25, 2021, 16 pages (with English translation).

PCT International Search Report and Written Opinion issued in International Application No. PCT/CN2020113827 on Dec. 9, 2020, 15 pages (with English translation).

Thales et al., "NR-NTN: Analysis of the applicability of NR numerology to satellite communication," 3GPP TSG RAN Plenary Meeting #78, RP-172277, Lisbon, Portugal, Dec. 18-21, 2017, 26 pages.

Extended European Search Report issued in European Application No. 20869826.6 on Oct. 13, 2022, 9 pages.

Tong et al., "Performance Enhancement of Faster-Than-Nyquist Signaling Based Single-Carrier Frequency-Domain Equalization Systems," IEEE Transactions on Broadcasting, vol. 62, No. 4, Dec. 2016, 18 pages.

Fraunhofer IIS et al., "Timing Advance Adjustments for Satellite Communications (NTN)," 3GPP TSG RAN WG1 Meeting, RAN1#96, R1-1903051, Feb. 25-Mar. 1, 2019, 5 pages.

Thales et al., "NR-NTN: solution principles for NR to support non-terrestrial networks," 3GPP TSG RAN1 Meeting #93, R1-1807864, Busan, Korea, May 21-25, 2018, 14 pages.

Office Action in Japanese Appln. No. 2022-519452, mailed on Jul. 11, 2023, 8 pages (with English translation).

* cited by examiner

SIGNAL TRANSMISSION METHOD BASED ON SATELLITE COMMUNICATION AND DEVICE

CROSS-REFERENCE TO RELATED APPLICATIONS

This application is a continuation of International Application No. PCT/CN2020/113827, filed on Sep. 7, 2020, which claims priority to Chinese Patent Application No. 201910936092.7, filed on Sep. 29, 2019. The disclosures of the aforementioned applications are hereby incorporated by reference in their entireties.

TECHNICAL FIELD

This application relates to the field of communications technologies, and in particular, to a signal transmission method based on satellite communication and a device.

BACKGROUND

A 5G network and a 5G evolved network in the future need to not only meet a plurality of service requirements, but also provide wider service coverage. A satellite plays an important role in the wireless communication field because of its features such as a long communication distance, wide coverage, flexible networking, and free of limitation of a geographical environment condition and a terrestrial device condition.

A satellite communication system has advantages that are not possessed by many terrestrial transmission devices. For example, in comparison with a terrestrial wireless communication system, the satellite communication system has wide coverage. In addition, in some regions in which it is not easy to deploy a terrestrial base station, for example, an ocean, a desert, and a mountain, communication may be implemented by using the satellite. However, for a terrestrial user terminal, the satellite has features such as a relatively high moving speed, a transmission loss of a satellite-to-ground link, and serious channel fading. Consequently, signal transmission quality in the satellite communication system is seriously affected. In addition, the satellite communication system is in a complex and variable channel environment due to a frequency selective fading feature of a multi-path channel. Therefore, the satellite communication system needs to use a multi-carrier transmission manner in which frequency selective fading is relatively well resisted.

An OFDM (orthogonal frequency division multiplexing, orthogonal frequency division multiplexing) technology is a multi-carrier communication solution with overlapping frequency bands, and has advantages of frequency selective fading-resistance and high frequency band utilization. When the OFDM technology is applied to the satellite system, frequency band utilization of the satellite communication system can be improved. In addition, an adverse impact from the complex and variable environment on signal transmission can be further weakened due to a multi-path fading-resistance feature of OFDM.

However, currently, the OFDM technology is also mainly applied in a terrestrial communication scenario, and an OFDM symbol is also designed for a terrestrial communications device. In practice, the satellite has a relatively high moving speed in comparison with the terrestrial communications device, and transmission is also affected by factors such as multi-path propagation, a delay spread, a fading feature, and a Doppler effect. If the OFDM technology is applied in a satellite communication scenario, inter-symbol interference and inter-carrier interference are easily caused, and a transmission requirement of the satellite communication system cannot be met. Therefore, an application of the OFDM technology is relatively poor.

SUMMARY

This application provides a signal transmission method based on satellite communication and a device, to better apply an OFDM technology in a satellite communication system to implement signal transmission.

The following describes this application from a plurality of aspects. It is easy to understand that implementations of the plurality of aspects may be mutually referenced.

According to a first aspect, this application provides a signal transmission method based on satellite communication. The method is applied to a communications device such as a satellite device or a terminal device. The method includes:

A communications device obtains carrier attribute information corresponding to a target carrier used to transmit an OFDM symbol. The carrier attribute information of the target carrier includes subcarrier spacing. The communications device determines a CP (cyclic prefix, cyclic prefix) length of the OFDM symbol based on the carrier attribute information of the target carrier and a preset correspondence between carrier attribute information and an OFDM symbol. The CP length is a length used to carry data in the OFDM symbol.

It can be learned that, after obtaining the carrier attribute information corresponding to the target carrier used to transmit the OFDM symbol to a terminal, the communications device determines, based on the preset correspondence between carrier attribute information and an OFDM symbol, the CP length of the OFDM symbol corresponding to the carrier attribute information of the target carrier. In this embodiment of this application, a CP length of an OFDM symbol corresponding to each carrier is no longer fixed. Therefore, when transmitting the OFDM symbol, a satellite communication system reduces a CP length based on carrier attribute information to improve resource utilization; or increases a CP length based on carrier attribute information, to avoid introducing inter-symbol interference, reduce a bit error rate, and improve system performance.

In some implementations, after the communications device obtains the carrier attribute information corresponding to the target carrier used to transmit the OFDM symbol, the method further includes: The communications device determines a CS length of the OFDM symbol based on the carrier attribute information of the target carrier and a preset correspondence between carrier attribute information and a CS (cyclic suffix, cyclic suffix) length. Herein, the CS length is a part of the CP length and/or a length of a part of the data in the OFDM symbol.

In some implementations, the carrier attribute information further includes one or more of a beam identifier and a beam elevation angle of a beam in which the target carrier is located.

In some implementations, the preset correspondence between carrier attribute information and an OFDM symbol includes a correspondence between subcarrier spacing and a CP length of an OFDM symbol.

In some implementations, the preset correspondence between carrier attribute information and an OFDM symbol further includes a correspondence between subcarrier spacing and each of a CP length and a CS length; or a correspondence between each of subcarrier spacing and a beam identifier, and each of a CP length and a CS length; or a correspondence between each of subcarrier spacing and a beam elevation angle, and each of a CP length and a CS length; or a correspondence between each of subcarrier spacing, a beam identifier, and a beam elevation angle, and each of a CP length and a CS length.

In some implementations, the CP is further used to carry second data. The second data is data different from the OFDM symbol.

According to a second aspect, this application provides a communications device, for example, a satellite device or a terminal device. The communications device includes: an obtaining unit, configured to obtain carrier attribute information corresponding to a target carrier used to transmit an OFDM symbol, where the carrier attribute information of the target carrier includes subcarrier spacing; and a determining unit, configured to determine a CP length of the OFDM symbol based on the carrier attribute information of the target carrier and a preset correspondence between carrier attribute information and an OFDM symbol, where the CP length is a length used to carry data in the OFDM symbol.

In some implementations, the determining unit is further configured to determine a CS length of the OFDM symbol based on the carrier attribute information of the target carrier and the preset correspondence between carrier attribute information and an OFDM symbol, where the CS length is a part of the CP length and/or a length of a part of the data in the OFDM symbol.

In some implementations, the carrier attribute information further includes one or more of a beam identifier and a beam elevation angle of a beam in which the target carrier is located.

In some implementations, the preset correspondence between carrier attribute information and an OFDM symbol includes a correspondence between subcarrier spacing and a CP length of an OFDM symbol.

In some implementations, the preset correspondence between carrier attribute information and an OFDM symbol further includes a correspondence between subcarrier spacing and a CS length of an OFDM symbol.

In some implementations, the CP is further used to carry data different from the data in the OFDM symbol.

According to a third aspect, this application provides a computer storage medium. The computer storage medium may be non-volatile. The computer storage medium stores computer-readable instructions. When the computer-readable instructions are executed by a processor, the method provided in any one of the foregoing implementations is implemented.

According to a fourth aspect, this application provides a computer program product. The computer program product includes computer-readable instructions. When the computer-readable instructions are executed by a processor, the method provided in any one of the foregoing implementations is implemented.

According to a fifth aspect, this application provides a communications device, for example, a satellite device or a terminal device. The communications device includes a processor and a memory. The memory is configured to store computer-readable instructions (or referred to as a computer program), and the processor is configured to read the computer-readable instructions to implement the method provided in any one of the foregoing aspects related to the communications device and the implementations thereof.

In some implementations, the communications device further includes a transceiver, configured to receive and send data.

DESCRIPTION OF EMBODIMENTS

Figure 1:
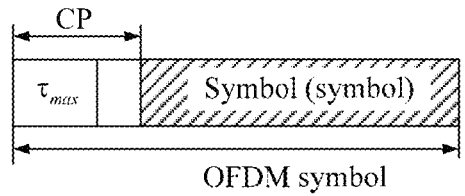
FIG. 1 is a schematic diagram of a length relationship between a CP inserted in each OFDM symbol and a length of a maximum delay spread according to an embodiment of this application.

To make the objectives, technical solutions, and advantages of this application clearer and more comprehensible, the following further describes this application in detail with reference to the accompanying drawings and the embodiments. It should be understood that, the specific embodiments described herein are merely used to explain this application but are not intended to limit this application. Clearly, the described embodiments are merely some but not all of the embodiments of this application. All other embodiments obtained by a person of ordinary skill in the art based on the embodiments of this application without creative efforts shall fall within the protection scope of this application.

The following explains some words appearing in this specification:

(1) An OFDM technology is dividing a specific channel into many orthogonal subchannels in frequency domain, and performing modulation by using one subcarrier in each subchannel. Herein, transmission on subcarriers is performed in parallel.

(2) A channel is many carriers that are orthogonal to each other at different frequencies in an OFDM system.

(3) An OFDM symbol indicates a waveform formed in a symbol period through modulating subcarriers that are orthogonal to each other.

(4) ISI (inter-symbol interference, inter-symbol interference) indicates, for an OFDM symbol, aliasing that is caused due to multi-path transmission and that is of OFDM symbols that are transmitted on different paths and that are received by a receiving device.

(5) ICI (inter-carrier interference, inter-carrier interference) indicates that subcarriers are not orthogonal to each other.

(6) A multi-path effect, also referred to as multi-path fading, indicates a phenomenon that signal attenuation occurs in a radio wave transmission process due to reflection, diffraction, scattering, and the like caused by topography and terrestrial objects. Because some waves cannot arrive at a receive end due to multi-path propagation, a signal received by the receive end is also a combined signal of signals with different phases, frequencies, and arrival times that are sent on a plurality of paths. Therefore, a phenomenon such as frequent fading and delay spreading of signals occurs. This is referred to as multi-path fading or the multi-path effect.

(7) A timing bias (also referred to as a timing offset) indicates a time difference between a moment at which an OFDM symbol arrives at a receiving device and a timing moment that is preset for the receiving device to receive the OFDM symbol.

(8) A beam indicates a shape that is of an electromagnetic wave emitted by a satellite antenna and that is formed on a surface of the earth. This is like a specific range of a light beam of a flashlight. Alternatively, a satellite does not transmit signals at 360°, but transmits signal waves mainly in a specific direction.

It should be understood that, in descriptions of this application, the terms such as "first", "second", and "third" are merely used for differentiation and description, but cannot be understood as an indication or implication of relative importance or an indication or implication of an order.

Currently, in comparison with conventional FDM, OFDM has relatively high spectrum utilization. In the conventional FDM, a channel is divided based on frequency bands for different users to use. To avoid carrier interference between different frequency bands, a guard band needs to be reserved between adjacent carriers. Therefore, spectrum utilization is reduced in an FDM system. In an OFDM technology, subcarriers are arranged in an overlapping manner, and orthogonality between the subcarriers is maintained. Therefore, in comparison with the conventional FDM, the OFDM has high spectrum efficiency, to save many spectrum resources.

In an OFDM communication system, it is required that subcarriers in an OFDM symbol are orthogonal to each other, and each carrier has an integral quantity of carrier periods in one symbol time. However, inter-symbol interference may be caused due to a multi-path effect of a carrier, thereby damaging direct orthogonality of the subcarrier. To eliminate the inter-symbol interference to a maximum extent, before sending an OFDM symbol, a sending device needs to insert a guard interval between two adjacent OFDM symbols. Herein, a length of the guard interval needs to be greater than a maximum delay spread of a channel. In this way, one OFDM symbol does not cause interference to a next OFDM symbol, to eliminate inter-symbol interference. The maximum delay spread of the channel may also be referred to as a maximum channel delay or channel impulse response length. FIG. 1 is a schematic diagram of a structure of an NR OFDM symbol. Herein, $\tau_{max}$ indicates the maximum delay spread.

Currently, based on a maximum delay spread corresponding to each subcarrier spacing determined based on a channel model of a terrestrial network wireless communication system, structures of OFDM symbols with different subcarrier spacing are defined in an NR system, including duration of an OFDM symbol and CP duration (that is, a CP length), as shown in the following Table 1. Herein, a numerology may be understood as a carrier identifier or index.

TABLE 1

| Numerology (carrier parameters) | 0 | 1 | 2 | 3 | 4 |
| --- | --- | --- | --- | --- | --- |
| Subcarrier spacing (kHz) | 15 | 30 | 60 | 120 | 240 |
| OFDM symbol length (μs) | 66.67 | 33.33 | 16.67 | 8.33 | 4.17 |
| CP length (μs) | 4.69 | 2.34 | 1.17 | 0.57 | 0.29 |
| OFDM symbol length + CP length | 71.35 | 35.68 | 17.84 | 8.92 | 4.46 |

In conclusion, the OFDM technology is widely used in the terrestrial communication system. In recent years, with development of a satellite device, advantages of satellite communication become more apparent. These advantages include, for example, a long communication distance, wide coverage, and free of limitation due to a geographical environment condition. Therefore, the satellite communication plays an increasingly important role in the wireless communication field. However, in addition to a geostationary earth orbit satellite system, a satellite in another type of satellite system has a specific moving speed relative to the ground. A lower orbital height indicates a greater relative speed. When a satellite device has a relatively large moving speed relative to UE, a serious timing drift is generated when an OFDM symbol is transmitted. In addition, ISI and ICI are introduced. Because the OFDM system is an orthogonal multi-carrier transmission system, performance of the OFDM system is easily affected by a timing offset. Therefore, if the foregoing described transmission mechanism of the NR OFDM symbol is simply applied in the satellite communication system, the serious timing drift is generated, thereby causing problems such as poor system stability and a high bit error rate. In addition, the satellite communication system cannot copy the OFDM symbol transmission mechanism of the terrestrial communication system. In other words, the existing transmission mechanism of the NR OFDM symbol cannot meet a transmission requirement of the satellite communication system. Therefore, application is relatively poor.

The foregoing NR OFDM symbol is not applicable to the satellite communication system mainly in the following two aspects, for example, In a first aspect, the following describes the timing drift that may be generated when the satellite communication system transmits the OFDM symbol.

The timing offset is a time difference between a moment at which the OFDM symbol arrives at a terminal device and a timing moment that is preset for the terminal device to receive the OFDM symbol.

Figure 2:
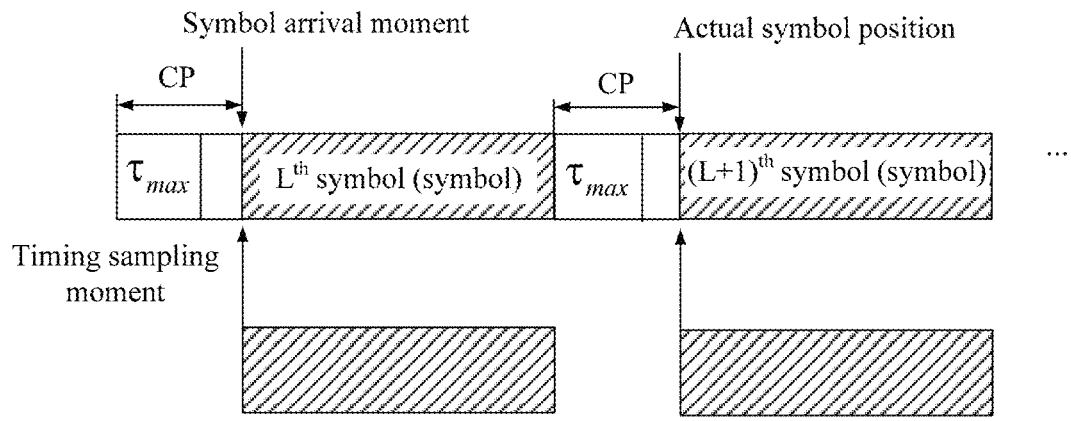
FIG. 2 is a schematic diagram of a scenario in which a timing offset is not generated when an OFDM is transmitted according to an embodiment of this application.

As shown in FIG. 2, a timing moment that is preset for the terminal device to receive the OFDM symbol (hereinafter referred to as a sampling timing moment) is fully consistent with a moment at which the symbol arrives at the terminal device (that is, an actual arrival moment of the OFDM symbol). In other words, no timing offset is generated. Probability that this case occurs in a high-speed movement scenario is extremely low.

Figure 3:
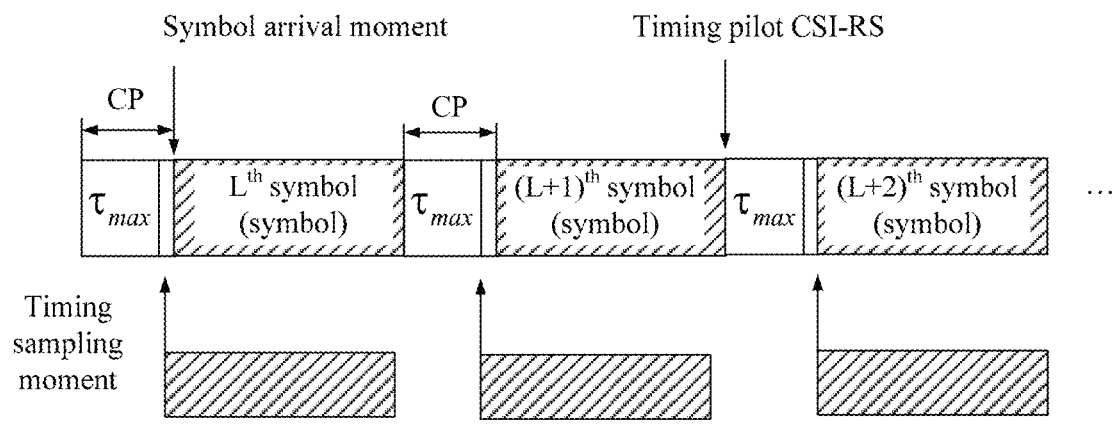
FIG. 3 is a schematic diagram of a scenario in which a timing forward bias is generated when an OFDM is transmitted according to an embodiment of this application.

As shown in FIG. 3, the sampling timing moment is earlier than the actual arrival moment of the OFDM symbol, that is, a timing forward bias occurs. A timing offset is generated. However, inter-symbol interference is not caused because the sampling timing moment is in a CP not $\tau_{max}$ (a maximum delay spread). A timing pilot CSI-RS (channel state information-reference signal, channel state information-reference signal) is used to calibrate the timing offset. The timing pilot CSI-RS is a periodic or aperiodic signal.

Figure 4:
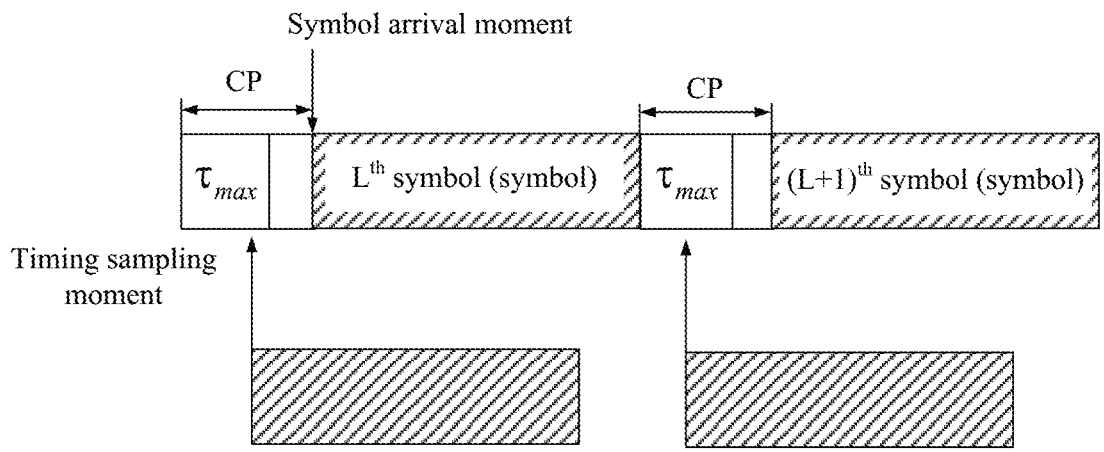
FIG. 4 is a schematic diagram of another scenario in which a timing forward bias is generated when an OFDM is transmitted according to an embodiment of this application.
Figure 5:
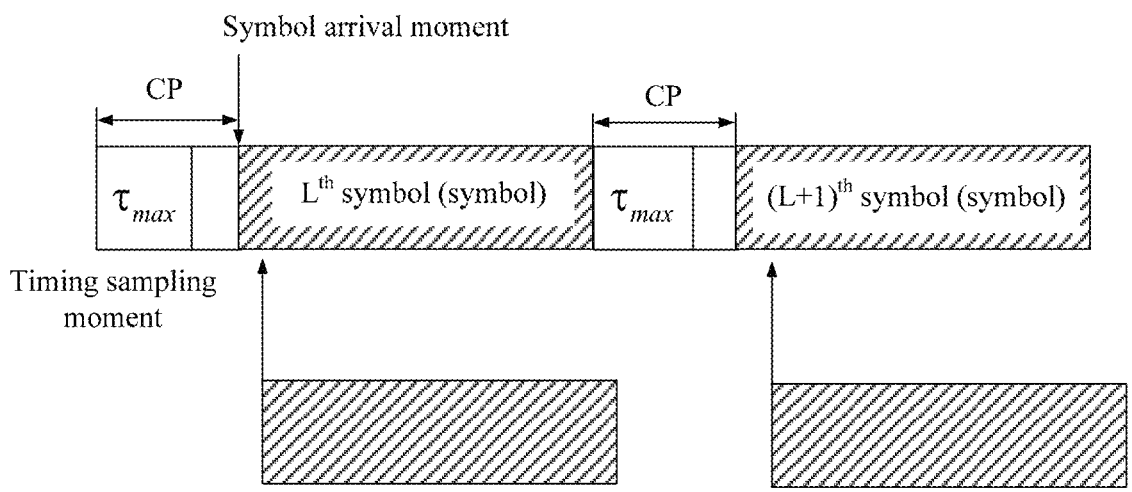
FIG. 5 is a schematic diagram of a scenario in which a timing backward bias is generated when an OFDM is transmitted according to an embodiment of this application.

FIG. 4 is a schematic diagram of another timing forward bias. FIG. 4 is similar to FIG. 3. FIG. 3 and FIG. 4 both show a case in which a sampling timing moment is earlier than an actual position of an OFDM symbol. A difference therebetween is that the sampling timing moment in FIG. 4 is in $\tau_{max}$; and therefore, inter-symbol interference and inter-carrier interference are caused. It may be understood that the inter-symbol interference is caused, orthogonality between carriers is damaged, and the inter-carrier interference is introduced, because waveform aliasing occurs in the CP between a waveform of a tail of the currently received OFDM symbol and a waveform of a tail of a previous OFDM symbol transmitted due to a multi-path delay. As shown in FIG. 5, a sampling timing moment is later than an actual position of the OFDM symbol, that is, a timing backward bias occurs. A timing offset is also generated. A signal received in an OFDM symbol does not have a complete carrier waveform, thereby causing inter-symbol interference and inter-carrier interference.

A reason for generating a timing forward bias may be summarized as follows: A distance between a sending device and a receiving device gradually increases with time, that is, a movement trend of the sending device and the receiving device is becoming distant from each other. For example, the sending device is still, and the receiving device becomes distant from the sending device. In this case, a time at which data sent by the sending device arrives at the receiving device is later than a preset time. In other words, the sampling timing moment is earlier than the actual position of the OFDM symbol. On the contrary, a reason for generating a timing backward bias may be summarized as follows: A distance between a sending device and a receiving device gradually decreases with time, that is, a movement trend of the sending device and the receiving device is becoming close to each other. A time at which data sent by the sending device arrives at the receiving device is earlier than a preset time. In other words, the sampling timing moment is later than the actual position of the OFDM symbol.

It can be learned from an existing NR standard that in a terrestrial communication system, a maximum moving speed of a mobile terminal is approximately 0.2777 km/s. The speed may be negligible relative to a transmission speed of an electromagnetic wave. Therefore, in the terrestrial communication system, a symbol timing offset that may occur when an OFDM symbol is transmitted is mainly caused due to a multi-path effect of the electromagnetic wave. Therefore, a moment at which the OFDM symbol actually arrives at the terminal device can only be later than rather than earlier than a timing moment that is preset for the terminal device to receive the OFDM symbol. In other words, the cases shown in FIG. 3 and FIG. 4 are relatively common phenomena in the terrestrial communication system, and the case shown in FIG. 5 hardly appears in the terrestrial communication system.

Therefore, the transmission mechanism of an existing NR OFDM symbol is mainly designed for the cases in FIG. 3 and FIG. 4. However, in the satellite communication system, because a satellite device moves at a high speed, all the foregoing cases shown in FIG. 3 to FIG. 5 easily occur. Based on the existing NR OFDM symbol, a timing forward bias problem can be alleviated, but a timing backward bias problem cannot be resolved.

In another aspect, in the satellite communication system, a maximum delay spread that is of the satellite communication system and that is obtained based on a channel model of the satellite communication system is approximately 154.89 ns. However, with reference to the content shown in Table 1, it may be learned that in the existing NR OFDM symbol, a minimum value of a CP length is still 290 ns (with reference to an NR OFDM symbol with subcarrier spacing of 240 kHz in Table 1) far greater than a maximum delay spread of the satellite communication system. In other words, the CP length of the NR OFDM symbol is excessively large for the satellite communication system. A person skilled in the art that may understand that in the same modulation manner, a larger CP length indicates a smaller quantity of bits (bits) that can be carried in an OFDM symbol, thereby causing a waste of resources in satellite communication.

Figure 6:
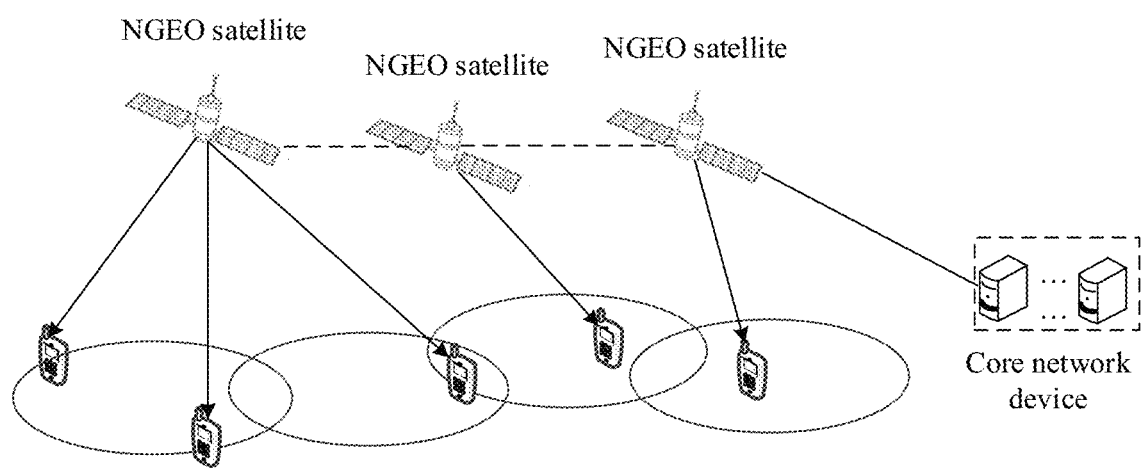
FIG. 6 is a schematic diagram of architecture of a mobile satellite communication system according to an embodiment of this application.

To resolve the foregoing problem, an embodiment of this application provides a signal transmission method based on satellite communication. To better understand the signal transmission method based on satellite communication disclosed in this embodiment of this application, an application scenario of this embodiment of this application is described first. With reference to FIG. 6, a typical network architecture of a satellite communication system is first used as an example for description, and a network architecture for actual satellite communication is similar to this.

FIG. 6 is a schematic diagram of possible architecture of a mobile satellite communication system to which this application is applicable. The system includes a satellite device and a terminal device. If the satellite communication system is compared with a terrestrial communication system, the satellite device may be considered as one or more network devices such as a base station on the ground. The satellite device provides a communication service for the terminal device. The satellite device may be further connected to a core network device (for example, an access and mobility management function (access and mobile management functions, AMF) network element).

A satellite base station mainly provides a wireless access service for the terminal device, schedules a radio resource for the terminal device accessing the satellite base station, and provides a reliable radio transmission protocol, a data encryption protocol, and the like. The satellite base station is an artificial earth satellite, a high altitude aircraft, or the like that is used as a wireless communications base station, for example, an evolved base station (eNB) or a 5G base station (gNB). The satellite base station may be a geostationary earth orbit (geostationary earth orbit, GEO) satellite, may be a non-geostationary earth orbit (non-geostationary earth orbit, NGEO) satellite such as a medium earth orbit (medium earth orbit, MEO) satellite or a low earth orbit (low earth orbit, LEO) satellite, or may be a high altitude platform station (High Altitude Platform Station, HAPS) or the like. A running posture of the satellite device includes a ground non-gazing posture and a ground gazing posture. A satellite beam emitted by a satellite device in the ground non-gazing posture moves with the satellite. An angle of each beam emitted by the satellite does not change with time from a perspective of the satellite. Relatively frequent beam switching occurs at a fixed terrestrial point when the satellite flies over the point. For example, a flashlight is used to simulate a satellite orbit and circle around a globe. An angle of a beam emitted by the flashlight does not change. A speed of the satellite device is greater than a speed of the earth's rotation. Therefore, in addition to a synchronous satellite, a relationship between a satellite with a stationary orbit and the earth may be as follows: The earth is still, and the satellite device performs periodic circular motion around the earth. In this case, the beam emitted by the flashlight can sweep the globe around. For a gaze satellite system, an angle of each beam emitted by the satellite is adjusted in a specific manner, to realize continuous observation of the fixed terrestrial point. For example, a flashlight is used to simulate a satellite orbit and circle around a globe. In a running process of the flashlight, continuous observation of the same region is implemented through adjusting an angle of each beam emitted by the flashlight (a region illuminated by the flashlight does not change). It may be understood that the angle of each beam emitted by the flashlight is adjustable.

The terminal device (user equipment, UE) may be a wireless terminal device that can receive scheduling and indication information of the network device. The wireless terminal device may be a device that provides a user with voice and/or data connectivity, a handheld device having a wireless connection function, or another processing device connected to a wireless modem. The wireless terminal device may communicate with one or more core networks or the Internet through a radio access network (radio access network, RAN). The wireless terminal device may be a mobile terminal device, such as a mobile phone (or referred to as a "cellular" phone and a mobile phone (mobile phone)), a computer, or a data card, for example, may be a portable, pocket-sized, handheld, computer built-in, or in-vehicle mobile apparatus that exchanges language and/or data with the radio access network. For example, the wireless terminal device may include a personal communications service (personal communication service, PCS) phone, a cordless phone, a session initiation protocol (SIP) phone, a wireless local loop (wireless local loop, WLL) station, a personal digital assistant (personal digital assistant, PDA), a tablet computer (Pad), and a computer with a wireless transceiver function. The wireless terminal device may also be referred to as a system, a subscriber unit (subscriber unit), a subscriber station (subscriber station), a mobile station (mobile station), a mobile station (mobile station, MS), a remote station (remote station), an access point (access point, AP), a remote terminal (remote terminal), an access terminal (access terminal), a user terminal (user terminal), a user agent (user agent), a subscriber station (subscriber station, SS), customer premises equipment (customer premises equipment, CPE), a terminal (terminal), user equipment (user equipment, UE), a mobile terminal (mobile terminal, MT), or the like. Alternatively, the wireless terminal device may be a wearable device and a next-generation communication system, for example, a terminal device in a 5G network, a terminal device in a future evolved public land mobile network (public land mobile network, PLMN), or a terminal device in an NR communication system.

It should be understood that FIG. 6 is merely a simplified schematic diagram used as an example for ease of understanding. The communication system may further include another network device or another terminal device that is not shown in FIG. 6.

The following describes the embodiments of this application in detail by using a process of interaction between a terminal device and a satellite device as an example. The terminal device may be a terminal device that is in a wireless communication system and that has a wireless connection relationship with the satellite device. It may be understood that the satellite device and a plurality of terminal devices that are in the wireless communication system and that have wireless connection relationships with the satellite device may transmit an OFDM symbol according to the same technical solutions. This is not limited in this application.

In this embodiment of this application, for any carrier sent by satellite devices at different orbital heights, an OFDM symbol applicable to the carrier is calculated with reference to carrier attribute information of each carrier, and the carrier attribute information is bound to the determined OFDM symbol to form a correspondence between carrier attribute information of each carrier sent by a satellite device and an OFDM symbol. The correspondence is preset to a satellite device or a terminal device, that is, the communications device in this application. The carrier attribute information includes subcarrier spacing.

The communications device obtains carrier attribute information of a target carrier used to transmit an OFDM symbol to a peer device, queries the preset correspondence between carrier attribute information and an OFDM symbol, and determines a CP length of the OFDM symbol corresponding to the target carrier.

It may be learned that, in this embodiment of this application, the CP length of the OFDM symbol is adjusted based on the preset relationship between carrier attribute information and an OFDM symbol. The CP length of the OFDM symbol corresponding to each carrier is no longer fixed. Therefore, when transmitting an OFDM symbol, the satellite communication system may reduce a CP length based on carrier attribute information to improve resource utilization; or may increase a CP length based on carrier attribute information, to avoid introducing inter-symbol interference, reduce a bit error rate, and improve system performance.

Correspondingly, the preset correspondence between carrier attribute information and an OFDM symbol is a correspondence between subcarrier spacing and a CP length of an OFDM symbol.

Figure 7:
FIG. 7 is a schematic diagram of a structure of an OFDM symbol applicable to a satellite communication system according to an embodiment of this application.

In another implementation method, the preset correspondence between carrier attribute information and an OFDM symbol may further be a correspondence between subcarrier spacing and each of a CP length and a CS length of an OFDM symbol. The communications device may further query the preset correspondence between carrier attribute information and an OFDM symbol, and determine a CS length of the OFDM symbol corresponding to the carrier attribute information of the target carrier. In this way, if the timing backward bias shown in FIG. 5 occurs, the satellite communication system adds a CS segment to the OFDM symbol to avoid introducing inter-symbol interference. FIG. 7 shows an OFDM symbol defined based on a satellite communication system according to an embodiment of this application. The OFDM symbol includes a CP and a CS. Based on FIG. 1, FIG. 7 is an improvement of the NR OFDM symbol shown in FIG. 1.

It should be noted that the foregoing preset correspondence may be determined by the satellite device, may be determined after the terminal device or a third-party device obtains carrier attribute information of all carriers of the satellite device, or may be set by a person based on the foregoing correspondence determined by any device. Optionally, the foregoing correspondence may be preset in the satellite device, or may be determined through calculation in real time in a running process of the satellite device. This is not limited in this embodiment of this application.

The foregoing correspondence is distinguished based on an orbital height of a satellite device. In practice, the satellite device can emit a plurality of beams at the same time. Therefore, the foregoing correspondence may be further subdivided for a beam in which the target carrier is located. If a correspondence between a carrier and an OFDM symbol further includes beam information corresponding to the carrier, the carrier attribute information of the target carrier may further include a beam identifier and/or a beam elevation angle.

Figure 8:
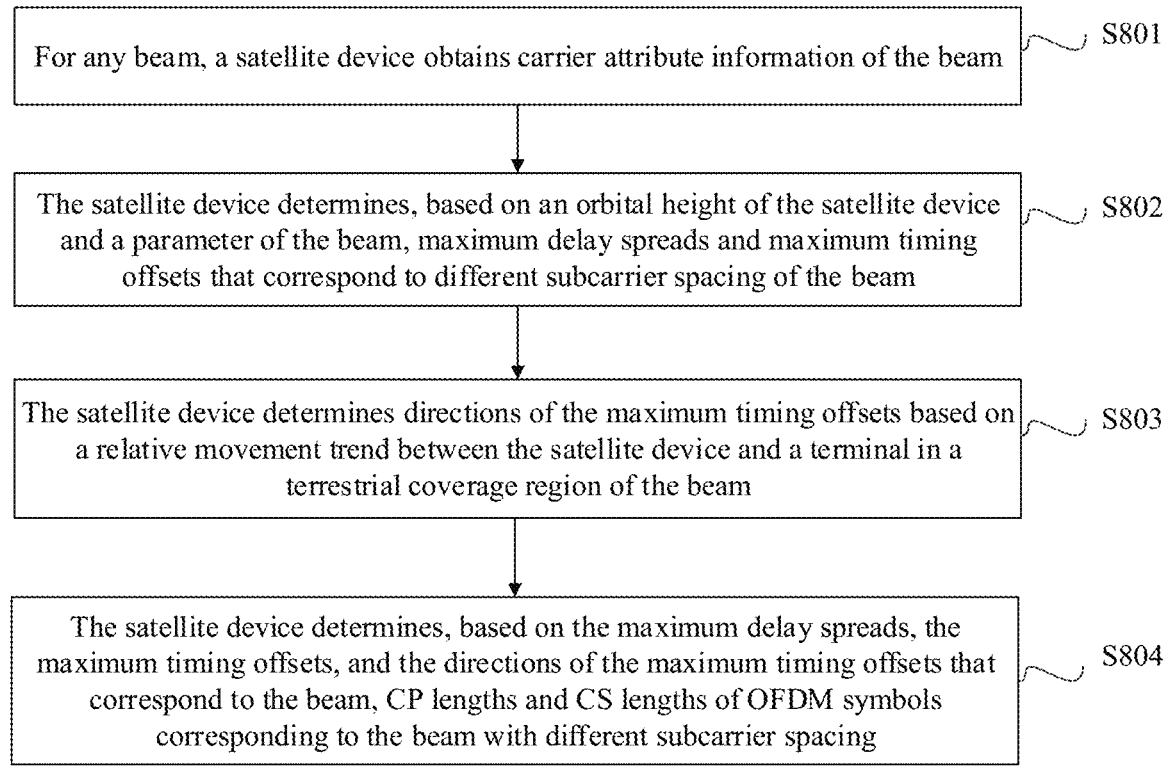
FIG. 8 is a schematic flowchart of a method for determining a CP length and a CS length that are of an OFDM symbol and that correspond to a beam parameter according to an embodiment of this application.

The following provides a method by using which the satellite device determines the correspondence between carrier attribute information and an OFDM symbol. It is assumed that the method is performed by the satellite device in the architecture shown in FIG. 6. As shown in FIG. 8, this application provides a method by using which the satellite device determines a CP length and a CS length corresponding to carrier attribute information. The method may include the following steps.

Step S801: For any beam emitted by the satellite device, the satellite device obtains a beam identifier and a beam elevation angle of the beam.

One beam emitted by the satellite device is used as an example. The satellite device obtains a beam identifier of the beam (each beam identifier corresponds to a unique beam of the satellite device) and a beam elevation angle of the beam.

Figure 9:
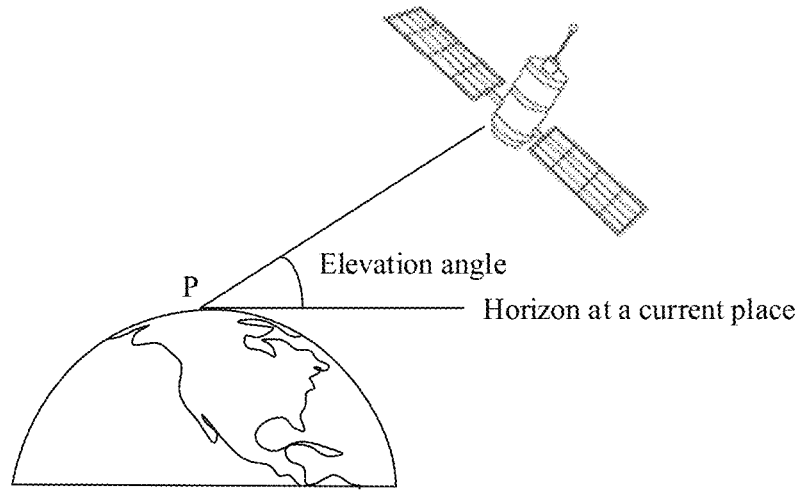
FIG. 9 is a schematic diagram of a relationship of a beam elevation angle of a beam of a satellite according to an embodiment of this application.

A person skilled in the art may understand that, a smaller beam elevation angle indicates a larger relative speed between the satellite device and a region. On the contrary, a larger beam elevation angle indicates a smaller relative speed between the satellite device and the region. A smaller relative speed indicates a smaller timing drift. In other words, different beam elevation angles indicate different maximum timing bias amounts of the beam. Therefore, in this embodiment of this application, when obtaining the beam elevation angle of the beam, the satellite device may select a minimum beam elevation angle between the beam and a coverage region of the beam, that is, the beam elevation angle of the beam at an edge of the coverage region at a surface of the earth. FIG. 9 is a schematic diagram of a beam elevation angle according to an embodiment of this application.

Step S802: The satellite device determines maximum delay spreads, values of maximum timing offsets, and directions of maximum timing offsets that correspond to different carriers in the beam.

It should be noted that different carriers in this application are determined to be different based on different subcarrier spacing. For example, if a plurality of carriers carried in the same beam have the same subcarrier spacing, it is considered that the plurality of carriers are the same.

(1) The satellite device determines the maximum delay spread corresponding to the carrier in the following manner:

The satellite device determines, based on channel models of satellite communication systems at different orbital heights, maximum multi-path spreads corresponding to different subcarrier spacing.

Figure 10:
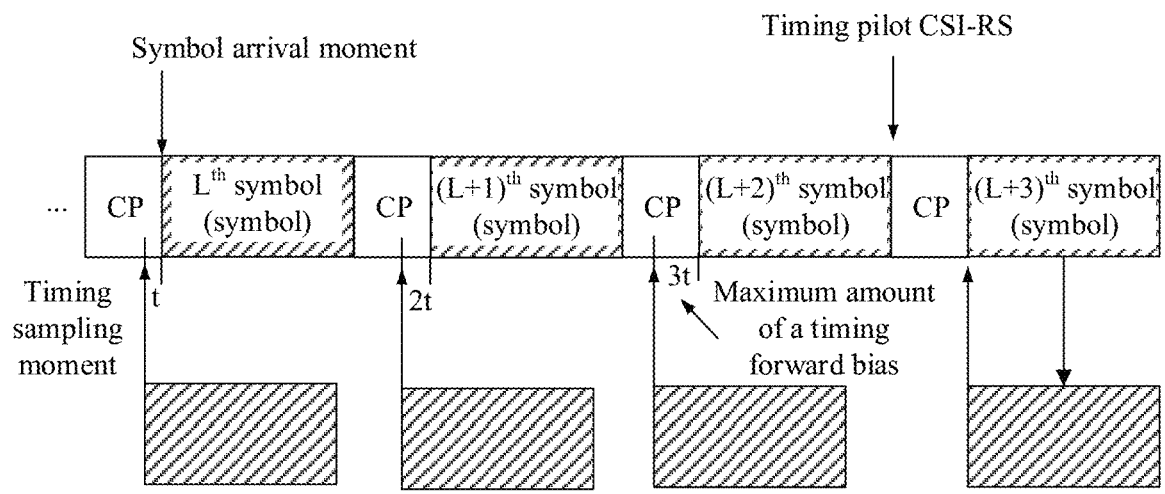
FIG. 10 is a schematic diagram of an accumulated timing offset corresponding to a timing forward bias generated when an OFDM is transmitted according to an embodiment of this application.
Figure 11:
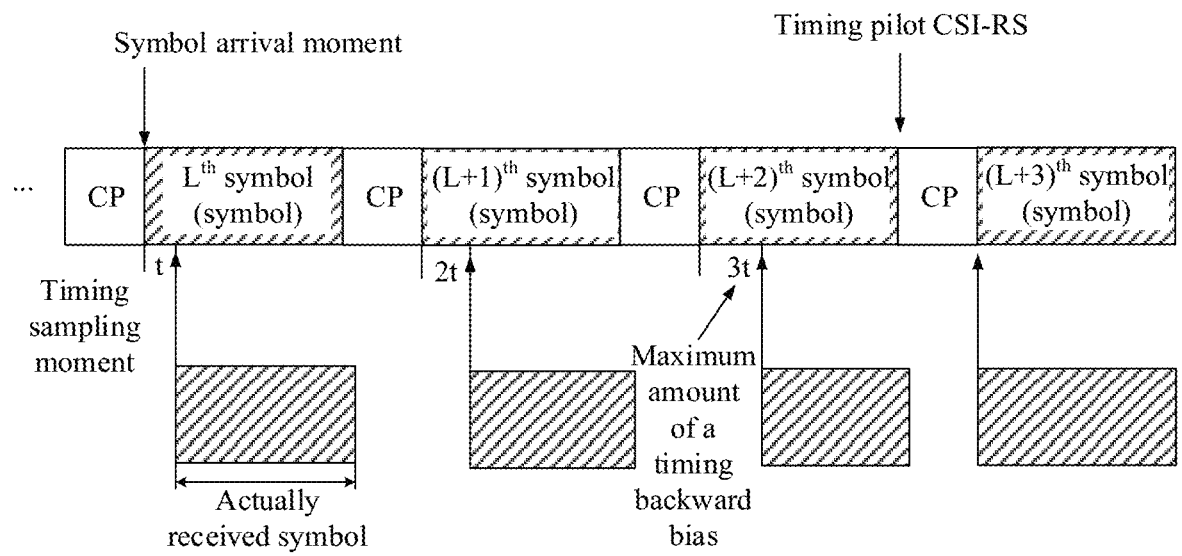
FIG. 11 is a schematic diagram of an accumulated timing offset corresponding to a timing backward bias generated when an OFDM is transmitted according to an embodiment of this application.
Figure 12:
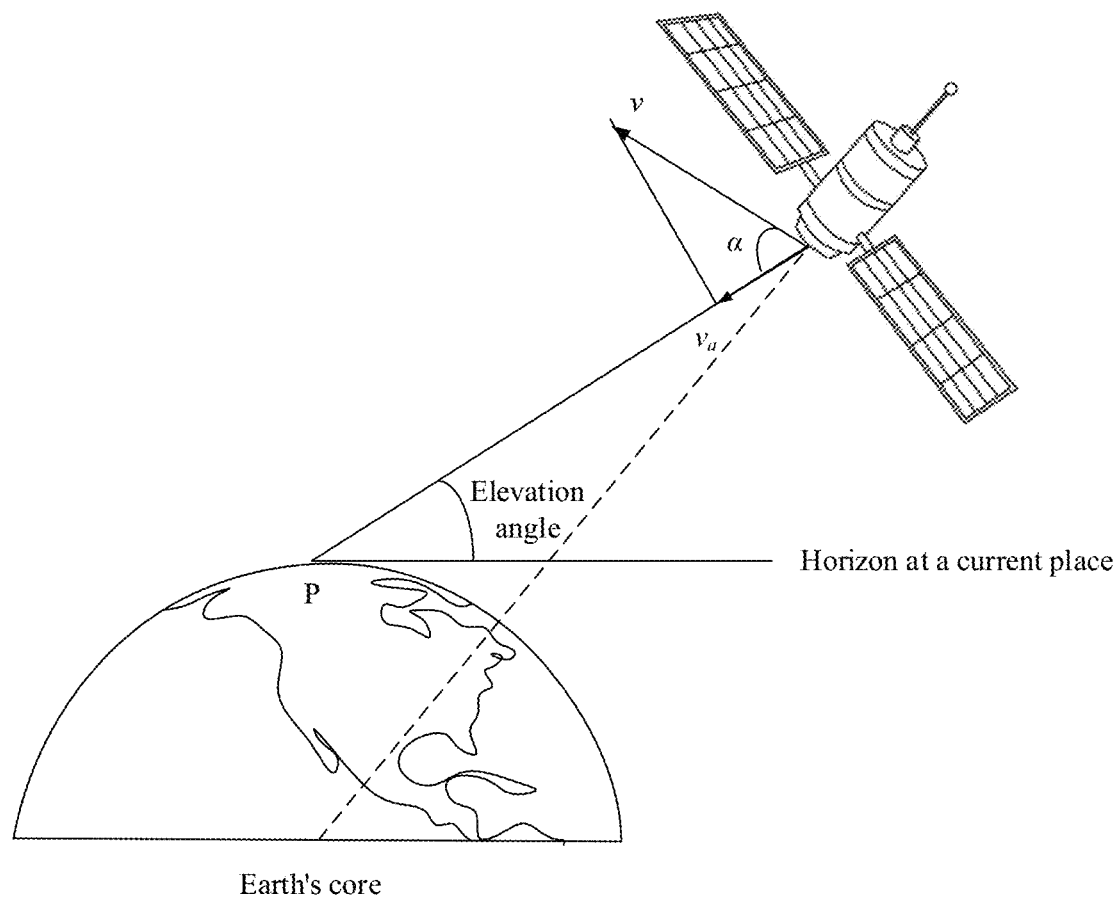
FIG. 12 is a schematic diagram of a relationship between a beam elevation angle of a beam of a satellite and a velocity component according to an embodiment of this application.

(2) The satellite device determines the maximum timing offset in the following manner:

A timing bias is reflected in a transmitted OFDM symbol, and is an accumulated timing offset amount between the satellite device and the terminal device in a timing pilot period. FIG. 10 is a schematic diagram of an accumulated timing offset of a timing forward bias. FIG. 11 is a schematic diagram of an accumulated timing offset of a timing backward bias. The maximum timing offset amount is an accumulated timing offset on a final symbol in a timing pilot period. For example, a manner of calculating the maximum timing offset amount is as follows:

For example, FIG. 12 is used as an example. It is assumed that a moving speed of the satellite device is approximately v (7.5622 km/s), an elevation angle at a P point at an edge of a coverage region of the beam is 10°, and a maximum relative position change between UE and the satellite is approximately a distance L (6.80598 m) in a time interval of 1 ms. In this case, a downlink timing offset in 1 ms is approximately $t=L/v_x$. A direction of the moving speed of the satellite is perpendicular to a direction of a connection line between the satellite and the earth's core. A velocity component of the moving speed of the satellite at the P point is $v_x$,$v$*cosa. Based on the foregoing values, a value of the downlink timing offset tin 1 ms is approximately 22.6866 ns (approximately 45Tc for a sampling point after conversion). It is assumed that a sending period of a timing pilot CSI-RS is 10 ms. In this case, a maximum timing offset in a timing pilot period is t*10=226.866 ns.

It may be learned that in this embodiment of this application, the maximum timing offset is determined in the foregoing manner, and a CP length and a CS length of the OFDM symbol are adjusted based on the maximum timing offset, to eliminate inter-symbol interference without increasing timing pilot overheads.

Step S803: The satellite device determines a direction of a maximum timing bias based on a relative movement trend between the satellite device and a terminal in a terrestrial coverage region of the beam.

The satellite device determines the direction of the maximum timing offset based on the relative movement trend between a position of the satellite device and the coverage region of the beam at the surface of the earth.

As shown above, if the relative movement trend between the satellite device and the coverage region of the beam at the surface of the earth is becoming close to each other, the satellite device determines that the direction of the maximum timing offset is a timing forward bias. If the relative movement trend between the satellite device and the coverage region of the beam at the surface of the earth is becoming distant from each other, the satellite device determines that the direction of the maximum timing offset is a timing backward bias.

When determining the relative movement trend between the satellite device and the coverage region of the beam at the surface of the earth, the satellite device may determine the relative movement trend based on an included angle between a direction of the moving speed of the satellite device and a directing of emitting the beam, and the beam elevation angle. The following provides descriptions by using examples.

Figures 13A, 13B:
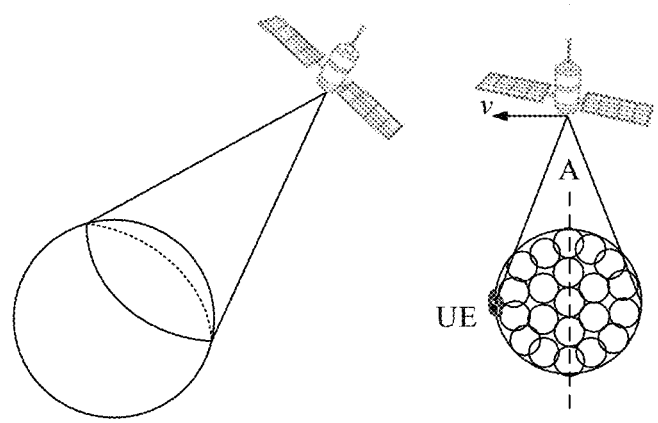
FIG. 13($a$) and FIG. 13($b$) are a schematic diagram of a non-gaze satellite system according to Embodiment 1 of this application.

Example 1: FIG. 13(a) and FIG. 13(b) are a schematic diagram of a scenario of a non-gaze satellite communication system according to an embodiment of this application. Herein, FIG. 13(a) is a schematic three-dimensional diagram in which a beam of a satellite irradiates a surface of the earth, and FIG. 13(b) is a schematic diagram of a top view plane relationship between a satellite device and an irradiated region. In FIG. 13(b), a largest circle is an entire region at a surface of the earth under irradiation of all satellite beams emitted by the satellite device. With reference to FIG. 13(b), the following describes a case in which the satellite device determines the relative movement trend between the satellite device and different regions.

In FIG. 13(b), a dashed line A is perpendicular to a moving direction of the satellite device. The moving direction of the satellite device is known. It may be learned from FIG. 13(b) that the satellite device is relatively close to a region on a left side of the dashed line A, and the satellite device is relatively distant from a region on a right side of the dashed line A. For example, it may be summarized from the foregoing position relationship that if an included angle between an emitted beam and the moving direction of the satellite is not greater than 90°, the relative movement trend is becoming close to each other; or if an included angle between the emitted beam and the moving direction of the satellite is greater than 90°, the relative movement trend is becoming distant from each other.

In a special case, for a coverage region (a region in which the dashed line A is located) of a beam whose included angle between the emitted beam and the moving direction of the satellite is equal to 90°, it may be considered that the satellite device is becoming close to the coverage region of the beam, or it may be considered that the satellite device is becoming distant from the coverage region of the beam. Alternatively, a larger beam elevation angle indicates a smaller relative speed between the satellite device and the terminal device, and a smaller timing offset. A smaller beam elevation angle indicates a smaller relative speed between the satellite device and the terminal device, and a larger the timing offset. Therefore, when determining the movement trend between the satellite device and the region in which the dashed line A is located, the satellite device may further determine the movement trend with reference to a minimum elevation angle between the beam and the region. For example, when the beam elevation angle is 0° to 30°, the satellite device is becoming distant from the coverage region of the beam; or when the elevation angle is 31° to 90°, the satellite device is becoming close to the coverage region of the beam.

Figures 14A, 14B:
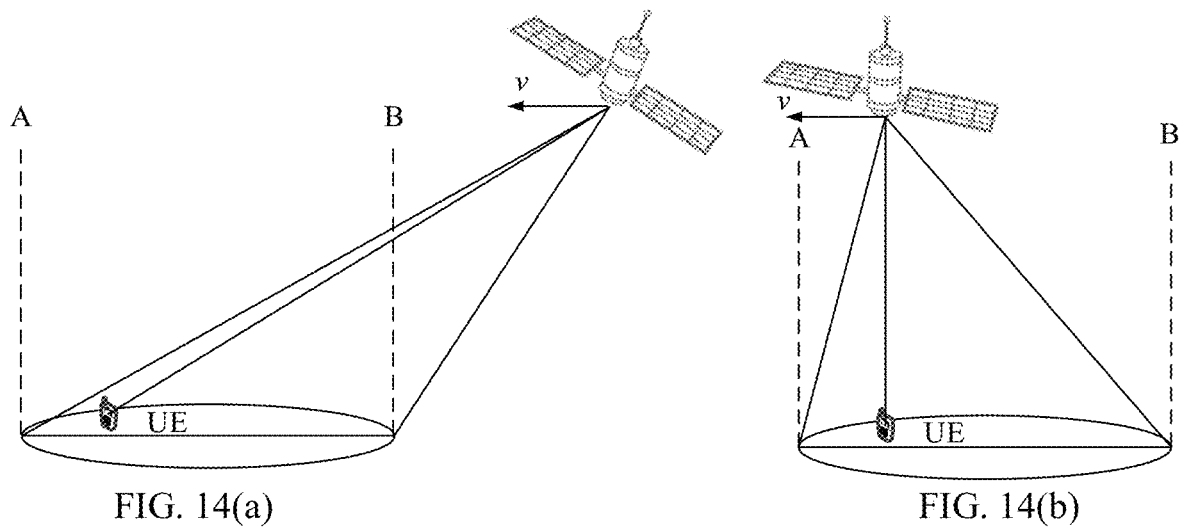
FIG. 14($a$) and FIG. 14($b$) are a schematic diagram of a gaze satellite system according to Embodiment 2 of this application.

Example 2: FIG. 14(a) and FIG. 14(b) are a schematic diagram of a scenario of a ground gaze posture according to an embodiment of this application. In the figure, an oval circle is a region irradiated by a satellite device at a surface of the earth, a dashed line A is a boundary on a left side of the coverage region, a dashed line B is a boundary on a right side of the coverage region, and a leftward arrow in the figure is a moving direction of the satellite device. With reference to FIG. 14(a) and FIG. 14(b), the following describes a case in which the satellite device determines a relative movement trend between the satellite device and different regions.

It may be learned from FIG. 14(a) and FIG. 14(b) that, when the satellite device is located on a right side of the dashed line B, the satellite device is becoming close to all coverage regions; or when the satellite device is located on a left side of the dashed line A, the satellite device is becoming distant from all coverage regions. When the satellite device is located between the dashed line A and the dashed line B, the satellite device is becoming close to some coverage regions of different beams and becoming distant from some coverage regions of different beams. The foregoing rules may be summarized as follows:

When the included angle between the moving direction of the satellite device and the emitted beam is less than or equal to 90°, the satellite is becoming close to the coverage region of the beam. When the included angle between the moving direction of the satellite device and the emitted beam is greater than 90°, the satellite device is becoming distant from the coverage region of the beam.

Step S804: The satellite device determines, based on the determined maximum delay spread, the determined value of the maximum timing offset, and the determined direction of the maximum timing offset that correspond to the carrier carried in the beam, the CP length and the CS length of the OFDM symbol corresponding to the carrier attribute information of the carrier.

The following provides different implementation methods by using which the satellite device determines the OFDM symbol.

In the following method, the carrier attribute information of the carrier includes the subcarrier spacing, the beam identifier, and/or the beam elevation angle.

Implementation method 1: The satellite device first determines the CP length based on the maximum delay spread, the value of the maximum timing offset, and the direction of the maximum timing offset, and adjusts the CS length based on the determined CP length.

A total length of the OFDM symbol in this embodiment of this application may be defined by using an NR standard. In other words, the satellite device adjusts the CP length of the NR OFDM symbol with the same subcarrier spacing based on a structure of the current NR OFDM symbol, the determined maximum delay spread, the value of the maximum timing offset, and the direction of the maximum timing offset. An example is as follows:

(1) Adjust the Timing Forward Bias.

If the direction of the maximum timing offset is the timing forward bias, the satellite device determines whether a sum of the maximum delay spread and the value of the maximum timing offset is greater than the CP length of the current NR OFDM symbol. If the sum is not greater than the CP length of the current NR OFDM symbol, there are the following several adjustment manners. Description is provided in the following by using examples:

Adjustment manner 1: The CP length of the current NR OFDM symbol is still used.

The satellite device uses the CP length of the NR OFDM symbol. For example, the CP segment is used to carry content (first data) that has the same length as the CP length and that is copied from a data tail of the OFDM symbol. In another example, the CP segment may be alternatively used to carry content that has a length less than the CP length and that is copied from a data tail of the OFDM symbol and other data (second data) that is different from data in the OFDM symbol.

Adjustment manner 2: Shorten the CP length of the OFDM symbol, and extend a length of data in the OFDM symbol.

The satellite device shortens the CP length of the OFDM symbol, so that the shortened CP length is greater than or equal to a sum of the values of the maximum delay spread and the maximum timing offset. Correspondingly, the shortened CP length part is used to carry the data of the OFDM symbol. It may also be understood as extending the length of the data in the OFDM symbol, so that the OFMD symbol can carry more data.

It may be understood that, with reference to the foregoing description, the total length of the OFDM symbol in the satellite communication system is defined based on the NR standard. In other words, the total length of the OFDM symbol after the CP length and the length of the data part in the OFMD symbol are adjusted does not change in this application. In other words, a sum of the shortened CP length and the extended length of the data part in the OFDM symbol is the same as the total length of the NR OFDM symbol before the adjustment. For example, when subcarrier spacing is 15 kHz, a total length of an OFDM symbol is 71.35 ns, a CP length is 4.69, and a length of data in the OFDM symbol is 66.67 ns. It is assumed that the adjusted CP length of the OFDM symbol is 2.69 ns. In this case, the length of the data in the OFDM symbol is 68.67 ns.

Figure 15:
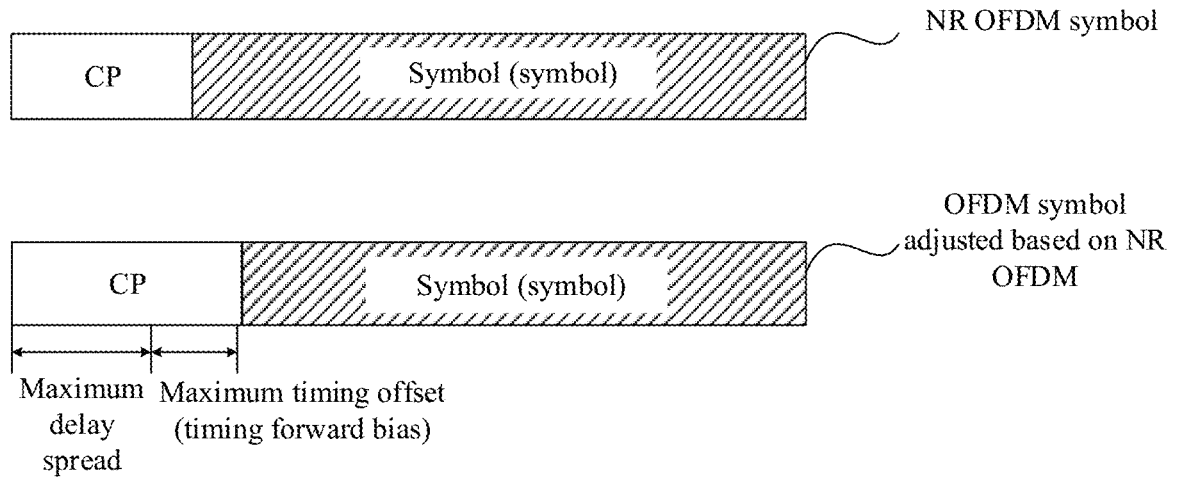
FIG. 15 is a schematic diagram of a relationship of adjusting a CP length based on a structure of an NR OFDM symbol according to an embodiment of this application.

If the sum of the maximum delay spread and the value of the maximum timing offset is greater than the CP length of the current NR OFDM symbol, the CP length in the NR OFDM symbol is extended, and the length of the data part in the OFDM symbol is reduced, so that the adjusted CP length is greater than or equal to the sum of the maximum delay spread and the maximum timing offset. FIG. 15 is a schematic diagram of a relationship among a CP length, a maximum delay spread, and a maximum timing offset in an adjusted OFDM symbol.

Optionally, after adjusting the CP length in the NR OFDM symbol, the satellite device determines the CS length based on the determined OFDM symbol. If the direction of the maximum timing offset is a timing forward bias, the satellite device determines that the CS part is added, that is, the CS length in the OFDM symbol is 0.

(2) Adjust the Timing Backward Bias.

Figure 16:
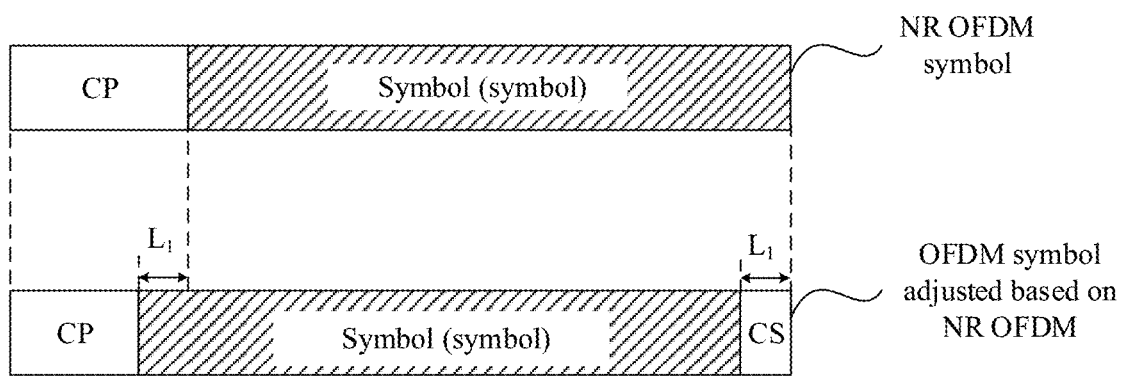
FIG. 16 is a schematic diagram of a relationship of adjusting a CP length and a CS length based on a structure of an NR OFDM symbol according to an embodiment of this application.

If the direction of the maximum timing offset is the timing backward bias, the satellite device determines whether the sum of the maximum delay spread and the maximum timing offset is greater than the CP length of the NR OFDM symbol with the same subcarrier spacing, and the satellite shortens the CP length to be greater than or equal to the maximum delay spread and uses a shortened part of the CP as the CS, that is, uses a part of the CP in the current NR OFDM symbol as the CS. As shown in FIG. 16, a part of the CP length is cut based on the NR OFDM symbol, and the cut part of the CP is used as the CS. The CS is used to carry content that has the same length as the CS length and that is copied from a head of the OFDM symbol.

Figure 17:
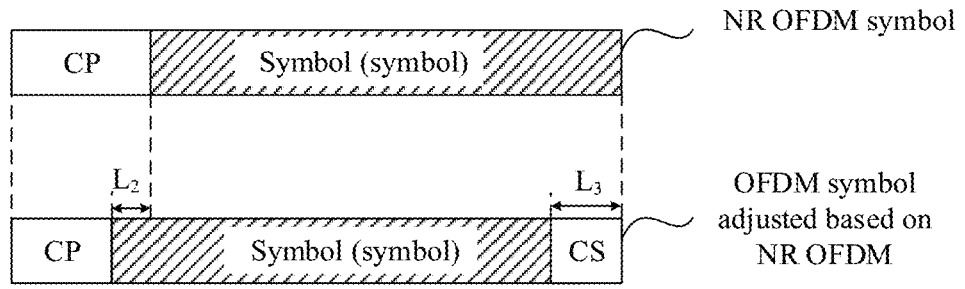
FIG. 17 is another schematic diagram of a relationship of adjusting a CP length and a CS length based on a structure of an NR OFDM symbol according to an embodiment of this application.

If the direction of the maximum timing offset is the timing backward bias, and the satellite device determines that a sum of the values of the maximum delay spread and the maximum timing offset is greater than the CP length of the NR OFDM symbol with the same subcarrier spacing, the satellite device may shorten the CP length to be greater than or equal to the maximum delay spread, and uses the shortened part of the CP length as a part of the CS. It should be noted that because the CS length is greater than the maximum timing offset, the shortened CP length is greater than the maximum delay spread. Therefore, the cut part of the CP is used as the CS, and the CS length is additionally increased, that is, the CS length includes a length of the part of the CP and a length of a part of the data in the OFDM symbol. As shown in FIG. 17, based on the NR OFDM symbol, a part of the CP length is cut, and the CS is formed by combining the part of the CP length and the length of the part of the data in the OFDM symbol. The CS is used to carry content that has the same length as the CS length and that is copied from a head of the OFDM symbol.

It should be noted that, when the CP length is adjusted, the CP length of the current NR OFDM symbol may also be used. As described in Adjustment manner 1, the CP segment may be used to carry content that is less than the CP length and that is copied from a tail of the data in the OFDM symbol and other data different from the data in the OFDM symbol. In other words, the CP length in the OFDM symbol does not change, and a data length of a segment of the OFDM symbol needs to be occupied to be used as the CS.

Implementation method 2: The satellite device first determines the CS length based on the maximum delay spread, the value of the maximum timing offset, and the direction of the maximum timing offset, and adjusts the CS length based on the determined CS length.

The satellite device may adjust the CS length of the NR OFDM symbol with the same subcarrier spacing based on a structure of the current NR OFDM symbol, the determined maximum delay spread, the determined value of the maximum timing offset, and the determined direction of the maximum timing offset. For example, (1) Adjust the Timing Forward Bias.

If the direction of the maximum timing offset is the timing forward bias, the satellite device determines that the CS length is 0. In other words, the CS does not need to be added to the OFDM symbol.

After determining that the CS length is 0, the satellite device determines the CP length. For a step of determining the CP length, refer to the step of determining the CP in the adjustment for the timing forward bias in Implementation method 1. Details are not described herein again.

(2) Adjust the Timing Backward Bias.

If the direction of the maximum timing offset is the timing backward offset, the satellite device determines that the CS length is greater than or equal to the value of the maximum timing offset. After the CS length is determined, the CP length is further determined. For a manner of determining the CS length, refer to the process of determining the CP length in Implementation method 1. Details are not described herein again.

A manner of forming the CS may be copying content of a CS length in a head of each OFDM symbol to a corresponding tail position of each OFDM symbol to form a cyclic suffix.

It is assumed that a running posture of the satellite device is a ground non-gaze posture. In a non-gaze satellite communication system, because an angle of a beam emitted by the satellite device does not change, a satellite elevation angle of each beam does not change. Therefore, a CP length and a CS length corresponding to the same subcarrier spacing of each beam do not change. After determining the CP length and the CS length corresponding to different subcarrier spacing of beams, the satellite device in the ground gaze posture may bind a beam identifier and subcarrier spacing to a corresponding CP length and a corresponding CS length, to form a first correspondence. The following Table 2 shows a correspondence provided in this embodiment of this application between subcarrier spacing and each of a CP length and a CS length.

the cells covered by the beams, information such as a cell identifier may be further added into the correspondence.

In the foregoing manner, because the terrestrial coverage region of the satellite device in the ground gaze posture does not change, and the speed of the satellite device is relatively high, the satellite device needs to adjust the CP length and the CS length of the OFDM symbol in real time based on the foregoing second correspondence. Therefore, a maximum value of a CP length and a maximum value of a CS length at different elevation angles of each beam with each subcarrier spacing may be further used as a CP length and a CS

TABLE 2

| | Beam identifier | | | | | | | | | |
|---|---|---|---|---|---|---|---|---|---|---|
| | 1 | | | | | ... | N | | | |
| | Numerology (carrier parameters) | | | | | | | | | |
| | 0 | 1 | 2 | 3 | 4 | ... | 0 | 1 | 2 | 3 | 4 |
| | Subcarrier spacing (kHz) | | | | | | | | | |
| | 15 | 30 | 60 | 120 | 240 | ... | 15 | 30 | 60 | 120 | 240 |
| CP length (μs) | 4.69 | 2.34 | 1.17 | 0.57 | 0.29 | ... | 4.642 | 2.292 | 1.122 | 0.482 | 0.39 |
| CS length (μs) | 0.21 | 0.15 | 0.10 | 0.14 | 0.10 | ... | 0.21 | 0.15 | 0.19 | 0.11 | 0.08 |

In a gaze satellite communication system, because the satellite device adjusts an emission angle of each beam, a beam elevation angle of each beam is a value that regularly changes, and the beam elevation angle of each beam has the same change range. Therefore, the CP length and the CS length corresponding to each beam with the same subcarrier spacing change with the beam elevation angle. Therefore, the satellite device in the ground gaze posture uses the foregoing method to separately determine CP lengths and CS lengths corresponding to beams with different subcarrier spacing at different beam elevation angles, and binds each of a beam identifier, a beam elevation angle, and subcarrier spacing, to each of a corresponding CP length and a corresponding CS length, to form a second correspondence. The following Table 3 shows the correspondence provided in this embodiment of this application between each of subcarrier spacing and a beam elevation angle, and each of a CP length and a CS length.

length corresponding to the beam. Correspondingly, the satellite device binds each of the subcarrier spacing and the beam identifier, to each of the CP length and the CS length, to form another form of the second correspondence. Alternatively, the satellite device determines maximum values of CP lengths and maximum values of CS lengths of different beams at each beam elevation angle with each subcarrier spacing, as a CP length and a CS length corresponding to the beam elevation angle. Correspondingly, the satellite device binds each of the subcarrier spacing and the beam elevation angle, to each of the CP length and the CS length, to form a third form of the second correspondence.

Optionally, different beams emitted by the same satellite device may further use the same OFDM symbol. The satellite device may further determine, in the following manner, a fixed OFDM symbol corresponding to a satellite device at each orbital height:

TABLE 3

| | Beam elevation angle | | | | | | | | | |
|---|---|---|---|---|---|---|---|---|---|---|
| | 10° | | | | | ... | n° | | | |
| | Numerology (carrier parameters) | | | | | | | | | |
| | 0 | 1 | 2 | 3 | 4 | ... | 0 | 1 | 2 | 3 | 4 |
| | Subcarrier spacing (kHz) | | | | | | | | | |
| | 15 | 30 | 60 | 120 | 240 | ... | 15 | 30 | 60 | 120 | 240 |
| CP length (μs) | 3.69 | 2.34 | 2.17 | 1.57 | 1.29 | ... | 3.542 | 2.192 | 2.022 | 1.422 | 0.89 |
| CS length (μs) | 0.15 | 0.14 | 0.12 | 0.11 | 0.10 | ... | 0.14 | 0.13 | 0.12 | 0.11 | 0.83 |

It should be understood that the foregoing tables are merely simplified example tables for ease of understanding. The foregoing tables may further include another item, or exclude an unnecessary item. This is not shown in the foregoing tables. For example, a length of an OFDM symbol or a total length of an OFDM symbol is included, or the carrier parameter item or the CS length item is excluded. Alternatively, when CP lengths and CS lengths corresponding to various beams in different cells are divided based on Based on a fixed satellite height in the NTN (non-terrestrial network, non-terrestrial network) protocol, an orbital height of a LEO satellite device is 600 km, a moving speed of the satellite device is 7.5622 km/s, and a downlink timing offset, in 1 ms, determined by using the foregoing method is approximately 22.6866 ns. An orbital height of a MEO satellite device is 1500 km, a moving speed of the satellite device is 7.1172 km/s, and a downlink timing offset in 1 ms is approximately 21.3516 ns. An orbital height of a HEO satellite device is 10000 km, a moving speed of the satellite device is 4.9301 km/s, and a downlink timing offset in 1 ms is approximately 14.7903 ns.

In addition, in the satellite communication system, the maximum delay spread that is of the satellite communication system and that is obtained based on the channel model of the satellite communication system is approximately 154.89 ns. However, it may be learned from the content shown in Table 1 that, in the existing NR OFDM symbol, a minimum value of a CP length is still 290 ns. Therefore, with reference to Table 1, it may be learned that a CP length of an NR OFDM symbol corresponding to other subcarrier spacing is greater than a sum of a maximum delay spread and a maximum timing offset. Therefore, to avoid a case of introducing ISI when the direction of the timing offset is the timing backward bias, a part of the CP length of the current NR OFDM symbol may be cut to be used as a CS. The following Table 4 shows determined CP lengths and CS lengths of an OFDM symbol corresponding to different subcarrier spacing of the LEO satellite device in this application.

TABLE 4

| Numerology (carrier parameters) | 0 | 1 | 2 | 3 | 4 |
|---|---|---|---|---|---|
| Subcarrier spacing (kHz) | 15 | 30 | 60 | 120 | 240 |
| OFDM symbol length (μs) | 66.67 | 33.33 | 16.67 | 8.33 | 4.17 |
| CP length (μs) | 4.463 | 2.113 | 0.943 | 0.343 | 0.29 |
| CS length (μs) | 0.227 | 0.227 | 0.227 | 0.227 | 0 |

The following Table 5 shows determined CP lengths and determined CS lengths of OFDM symbols corresponding to different subcarrier spacing of a MEO satellite device in this application.

TABLE 5

| Numerology (carrier parameters) | 0 | 1 | 2 | 3 | 4 |
|---|---|---|---|---|---|
| Subcarrier spacing (kHz) | 15 | 30 | 60 | 120 | 240 |
| OFDM symbol length (μs) | 66.67 | 33.33 | 16.67 | 8.33 | 4.17 |
| CP length (μs) | 4.476 | 2.126 | 0.956 | 0.356 | 0.29 |
| CS length (μs) | 0.214 | 0.214 | 0.214 | 0.214 | 0 |

The following Table 6 shows determined CP lengths and determined CS lengths of OFDM symbols corresponding to different subcarrier spacing of a HEO satellite device in this application.

TABLE 6

| Numerology (carrier parameters) | 0 | 1 | 2 | 3 | 4 |
|---|---|---|---|---|---|
| Subcarrier spacing (kHz) | 15 | 30 | 60 | 120 | 240 |
| OFDM symbol length (μs) | 66.67 | 33.33 | 16.67 | 8.33 | 4.17 |
| CP length (μs) | 4.542 | 2.192 | 1.022 | 0.422 | 0.29 |
| CS length (μs) | 0.148 | 0.148 | 0.148 | 0.148 | 0 |

It should be noted that, because a CP length of an NR OFDM symbol corresponding to subcarrier spacing of 240 kHz is 290 ns less than a sum of a maximum delay spread and a maximum timing offset, the CP length may not be cut. In addition, because a length of an OFDM symbol is also relatively small, if a CS is added, data carried in an OFDM symbol is few, thereby causing a waste of resources. Therefore, the CS may be not added, that is, a CS length is 0.

The satellite device binds each subcarrier spacing to a corresponding CP length and a corresponding CS length to form a third binding relationship. It should be noted that Table 3 and Table 4 are merely examples. The values of the CS length and the CP length in the table are merely examples, or may be other values. The values of the CS length and the CP length are not limited in this embodiment of this application. For example, Table 4 is used as an example. The length of the OFDM symbol corresponding to the subcarrier spacing of 240 kHz is adjusted to 4.022, and the CS length is adjusted to 0.148.

Figure 18:
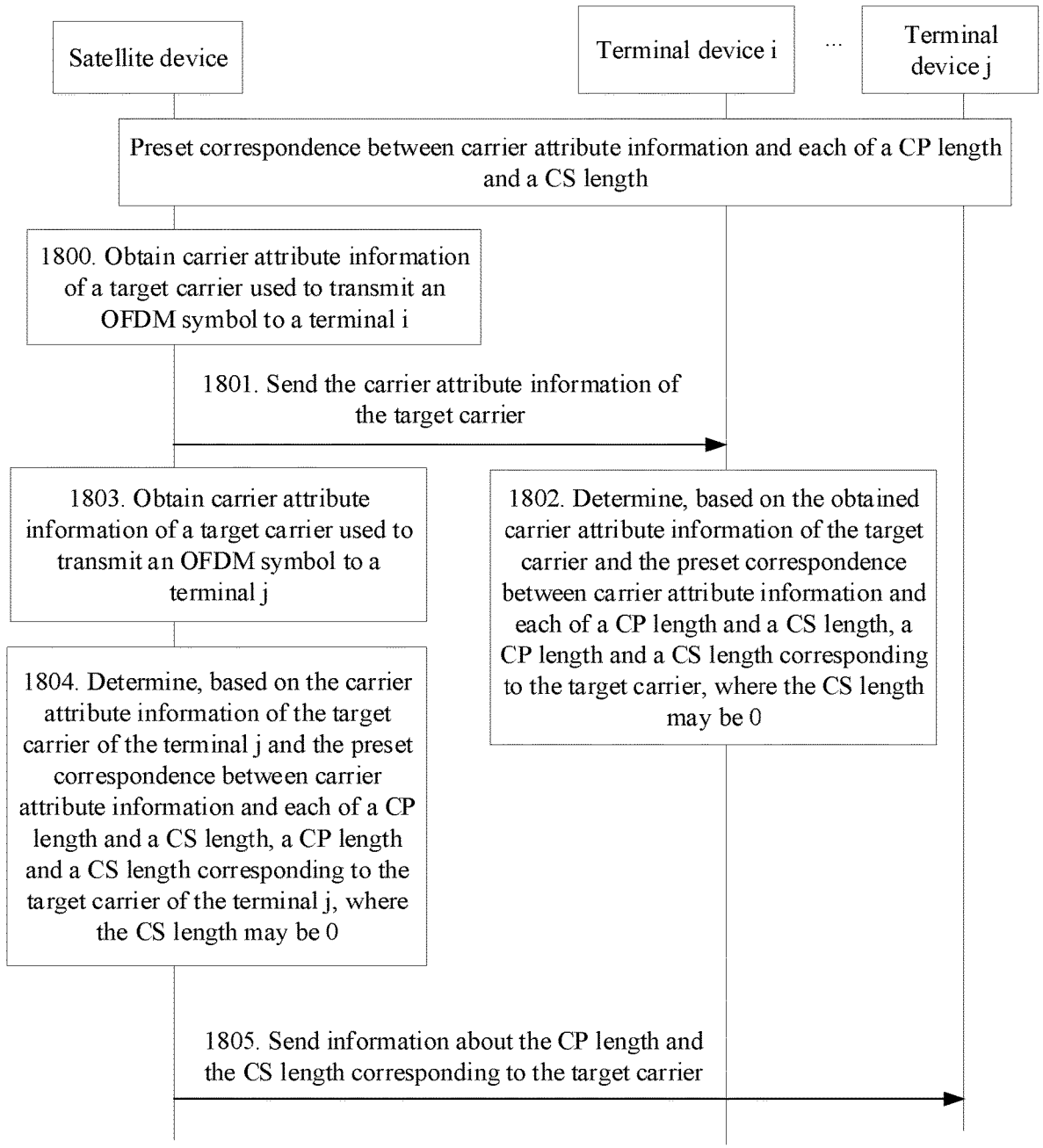
FIG. 18 is a schematic flowchart of a signal communication method based on satellite communication according to an embodiment of this application.

Optionally, the satellite device may further select, based on the first correspondence shown in Table 2, a maximum value of the CP length and a maximum value of the CS length corresponding to each subcarrier spacing, use the maximum value of the CP length as the CP length of the OFDM symbol corresponding to the subcarrier spacing, use the maximum value of the CS length as the CS length of the OFDM symbol corresponding to the subcarrier spacing, and bind the subcarrier spacing to the OFDM symbol to form a correspondence between subcarrier spacing of a satellite device at an orbital height in a ground non-gaze posture and each of a CP length and a CS length. Similarly, the satellite device may determine, based on the foregoing method, a correspondence between subcarrier spacing of the satellite device in a ground gaze posture and each of a CP length and a CS length. Further, after determining the correspondence between the carrier attribute information and each of the CP length and the CS length, the satellite device may notify the terminal device of the correspondence. Based on the architecture shown in FIG. 6, FIG. 18 shows a provided manner of transmitting an OFDM symbol based on a satellite communication system. The method may include the following steps.

Step 1800: A satellite device obtains carrier attribute information corresponding to a target carrier used to transmit an OFDM symbol to a terminal i.

Step 1801: The satellite device sends the carrier attribute information of the target carrier to the terminal i.

Step 1802: The terminal i obtains the carrier attribute information of the target carrier that is sent by the satellite device; and determines, based on the carrier attribute information of the target carrier and a preset correspondence between carrier attribute information and each of a CP length and a CS length, a CP length and a CS length corresponding to the target carrier.

Step 1803: The satellite device obtains carrier attribute information of a target carrier used to transmit an OFDM symbol to a terminal j.

Step 1804: The satellite device determines, based on the carrier attribute information of the target carrier of the terminal j and a preset correspondence between carrier attribute information and each of a CP length and a CS length, a CP length and a CS length corresponding to the target carrier of the terminal j. Herein, the CS length may be 0.

Step 1805: The satellite device sends, to the terminal j, information about the CP length and the CS length corresponding to the target carrier.

It should be noted that step 1800 to step 1802 and step 1803 to step 1805 are two interaction manners between the satellite device and the terminal device in the satellite communication system in this application, and do not indicate a sequence of the two manners. For example, the satellite device may simultaneously perform step 1800 to step 1802 and step 1803 to step 1805. This is not limited in this embodiment of this application.

The target carrier indicates a carrier that is sent by the satellite device and that is used to transmit an OFDM symbol to the terminal device. Specific sending manners include but are not limited to the following manners:

Sending manner 1: The satellite device notifies the terminal device in a broadcasting manner by using each beam.

The satellite device broadcasts the correspondence between carrier attribute information and each of a CP length and a CS length, the carrier attribute information of the target carrier, or the determined CP length and the determined CS length by using each beam. There are a plurality of types of carriers of the foregoing information. For example, the foregoing information is added into a MIB (master information block, master information block) or a SIB (system information block, system information block) for broadcasting. The following is described by using an example.

For example, the satellite device adds the determined correspondence into a MIB. A terminal device with an initial access beam obtains the correspondence based on the broadcast MIB. In addition, the satellite device may further add, into a MIB or a SIB for delivery, the carrier attribute information of the target carrier used to transmit the OFDM symbol to the terminal device. Therefore, the terminal device may determine the CP length and the CS length based on the obtained carrier attribute information of the target carrier and the obtained correspondence. Herein, the CS length may be 0.

Sending manner 2: The satellite device may alternatively notify the terminal device in a unicasting (point-to-point) manner.

The satellite device establishes a dedicated data link with each terminal device to transmit information such as the correspondence between carrier attribute information and each of a CP length and a CS length, the carrier attribute information of the target carrier, or the determined CP length and the determined CS length.

Manner 3: The satellite device performs forwarding by using a network device.

For example, the satellite device delivers the foregoing information to a base station corresponding to each beam, and the base station notifies a terminal device in a cell in which the base station is located.

The network device is an entity used to transmit or receive a signal on a network side, for example, a generation NodeB (generation NodeB, gNodeB). The network device may be a device configured to communicate with a mobile device. The network device may be an AP in a wireless local area network (wireless local area network, WLAN), a base transceiver station (base transceiver station, BTS) in a global system for mobile communications (global system for mobile communications, GSM) or code division multiple access (code division multiple access, CDMA), a NodeB (NodeB, NB) in wideband code division multiple access (wideband code division multiple access, WCDMA), an evolved NodeB (evolutional NodeB, eNB or eNodeB) in long term evolution (long term evolution, LTE), a relay station, an access point, a vehicle-mounted device, a wearable device, a network device in a future 5G network, a network device in a future evolved public land mobile network (public land mobile network, PLMN), a gNodeB in an NR system, or the like. In addition, in the embodiments of this application, the network device serves a cell, and the terminal device communicates with the network device by using a transmission resource (for example, a frequency domain resource, namely, a spectrum resource) used by the cell. The cell may be a cell corresponding to the network device (for example, a base station). The cell may belong to a macro base station, or may belong to a base station corresponding to a small cell (small cell). The small cell herein may include a metro cell (Metro cell), a micro cell (Micro cell), a pico cell (Pico cell), a femto cell (Femto cell), and the like. These small cells have features of small coverage and low transmit power, and are applicable to providing a high-rate data transmission service. In addition, in another possible case, the network device may be another apparatus that provides a wireless communication function for the terminal device. A specific technology and a specific device form that are used by the network device are not limited in the embodiments of this application. For ease of description, in the embodiments of this application, the apparatus that provides the wireless communication function for the terminal device is referred to as the network device.

Finally, to implement optimization of a low frequency band, a PT-RS pilot may be introduced into the low frequency band, so that the terminal device calculates and compensates for a phase noise based on the PT-RS pilot, to improve link performance.

A person skilled in the art knows that on an FR2 frequency band, the satellite device may send the PT-RS pilot to a receiving device, and the receiving device performs phase noise compensation based on the PT-RS pilot to correct phase changes of different symbols in the same slot. However, this technology is not yet implemented on an FR1 frequency band. In this embodiment of this application, time density of the PT-RS pilot introduced into the FR1 frequency band may use time density of a PT-RS pilot in the FR2 frequency band. Alternatively, the time density of the PT-RS pilot may be determined in the following manner:

Because a relatively high-speed movement between the satellite device and the terminal device causes phase changes of different symbols in the same slot, the time density of the PT-RS pilot may be divided based on a maximum relative speed between the satellite device and the terminal device. The following is described by using an example.

The following Table 7 shows division of time density that is of a PT-RS pilot on a low frequency band and that is set by an LEO for a speed of a terminal device according to an embodiment of this application.

TABLE 7

| UE speed (km/s)<br>(Speed of a terminal device) | Time density (symbol)<br>(Time density/Symbol) |
| --- | --- |
| V > 7.44 | 1 |
| 5.58 < V ≤ 7.44 | 2 |
| 3.72 < V ≤ 5.58 | 4 |
| V ≤ 3.72 | 0 |

Table 7 is explained as follows: When the speed of the terminal device is greater than 7.44 km/s, time density of sending a PT-RS pilot by the satellite device on an FR1 band is one time for each symbol. When the speed of the terminal device is greater than 5.58 km/s but is not greater than 7.74, a time password of sending a PT-RS pilot by the satellite device on the FR1 frequency band is one time for every four symbols, and so on.

It should be noted that Table 7 is merely an example. This embodiment of this application is not limited to a specific value. The value may fluctuate within a specific range. For satellite devices with different orbital heights, the time density of the PT-RS pilot on the FR1 band may be divided in the foregoing manner. Details are not described herein.

The satellite device notifies the receiving device of information about the time domain density of the PT-RS pilot. For example, the satellite device adds the information about the time density of the PT-RS pilot into a SIB or an RRC (radio resource control, radio resource control) message, and sends the SIB or the RRC message to the receiving device. The receiving device may be a terminal device or a network device.

Figure 19:
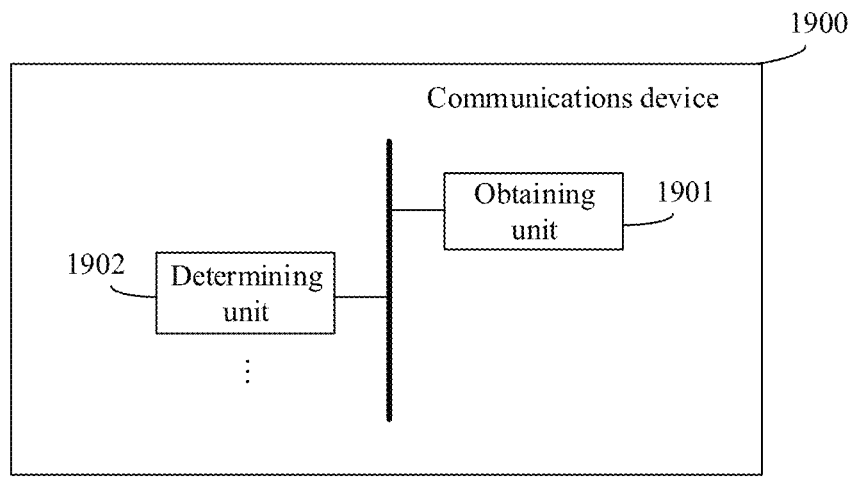
FIG. 19 is a schematic diagram of a structure of a communications device 1900 according to an embodiment of this application.

FIG. 19 is a schematic diagram of a structure of a communications device 1900 according to an embodiment of this application, for example, a terminal device or a satellite device. As shown in FIG. 19, the communications device 1900 includes an obtaining unit 1901 and a determining unit 1902.

The obtaining unit 1901 is configured to obtain carrier attribute information corresponding to a target carrier used to transmit an OFDM symbol. The carrier attribute information of the target carrier includes subcarrier spacing.

The determining unit 1902 is configured to determine a CP length of the OFDM symbol based on the carrier attribute information of the target carrier and a preset correspondence between carrier attribute information and a CP length. A CP is used to carry first data. The first data is data in the OFDM symbol.

Optionally, the determining unit 1902 is further configured to determine a CS length of the OFDM symbol based on the carrier attribute information of the target carrier and the preset correspondence between carrier attribute information and a CS length. The CS length is a part of the CP length and/or a length of a part of data in the OFDM symbol.

Optionally, the carrier attribute information further includes one or more of a beam identifier and a beam elevation angle of a beam in which the target carrier is located.

Optionally, a preset correspondence between carrier attribute information and an OFDM symbol includes a correspondence between subcarrier spacing and a CP length.

Optionally, the preset correspondence between carrier attribute information and an OFDM symbol further includes a correspondence between subcarrier spacing and each of a CP length and a CS length; or
 a correspondence between each of subcarrier spacing and a beam identifier, and each of a CP length and a CS length; or
 a correspondence between each of subcarrier spacing and a beam elevation angle, and each of a CP length and a CS length; or
 a correspondence between each of subcarrier spacing, a beam identifier, and a beam elevation angle, and each of a CP length and a CS length.

Optionally, the CP is further used to carry second data. The second data is data different from the OFDM symbol.

In the embodiments of this application, some units (or components) of the communications device may be implemented by using a hardware circuit, and some other units (or components) are implemented by using software, or all units (or components) may be implemented by using a hardware circuit, or all units (or components) are implemented by using software.

Figure 20:
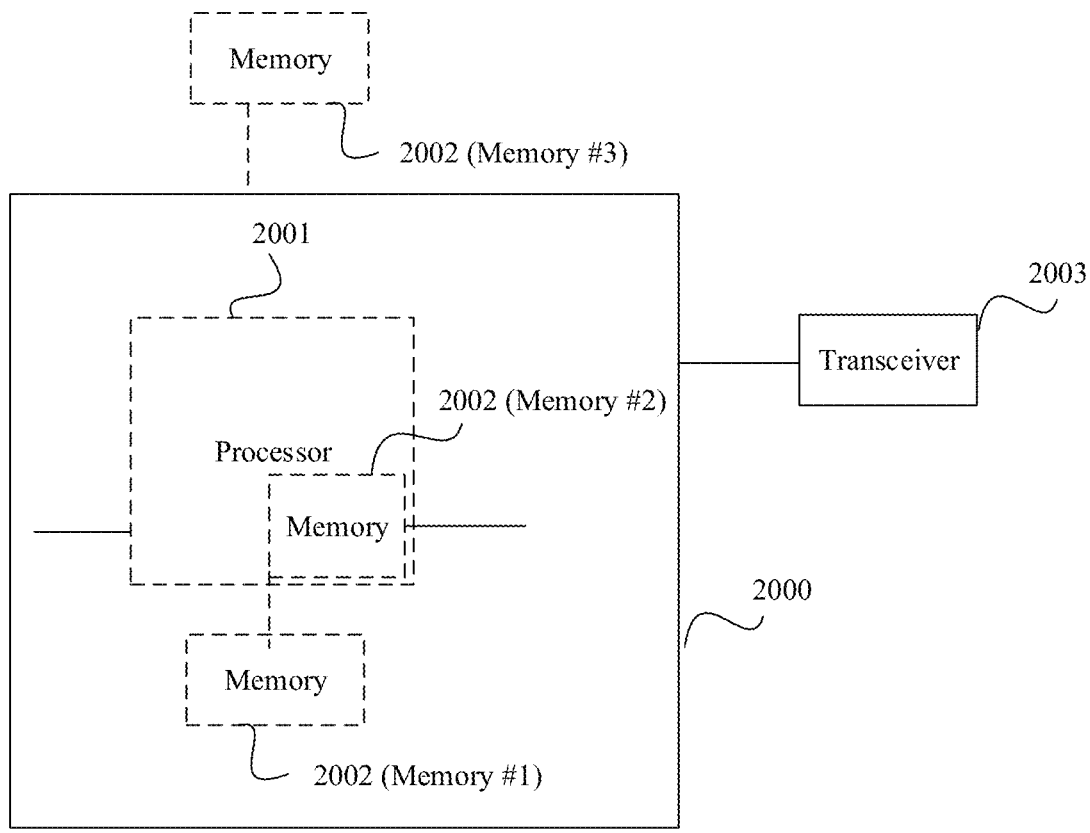
FIG. 20 is a schematic diagram of a structure of another communications device 2000 according to an embodiment of this application.

FIG. 20 is a schematic diagram of a structure of communications device 2000 according to an embodiment of this application. As shown in FIG. 20, a communications device 2000 is, for example, a satellite device or a terminal device. The communications device 2000 includes a processor 2001 and a memory 2002. The memory 2002 may be a memory (Memory #3) independent of the processor or a network device, or may be a memory (Memory #1 or Memory #2) in the processor or a network device. The memory 2002 may be a physically independent unit, or may be storage space, a network hard disk, or the like on a cloud server.

The memory 2002 is configured to store computer-readable instructions (or referred to as a computer program).

The processor 2001 is configured to read the computer-readable instructions to implement the method provided in any one of the foregoing aspects related to the communications device and the implementations thereof.

Optionally, the memory 2002 (Memory #1) is located in the apparatus.

Optionally, the memory 2002 (Memory #2) is integrated with the processor.

Optionally, the memory 2002 (Memory #3) is located outside the apparatus.

Optionally, the first network device further includes a transceiver 2003, configured to receive and send data.

In addition, the processor 2001 may be a central processing unit, a general-purpose processor, a digital signal processor, an application-specific integrated circuit, a field programmable gate array or another programmable logic device, a transistor logic device, a hardware component, or any combination thereof. The processor 2001 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. In addition, the memory 2002 may include a volatile memory (volatile memory), for example, a random access memory (random access memory, RAM). The memory may alternatively include a non-volatile memory (non-volatile memory), for example, a flash memory (flash memory), a hard disk drive (hard disk drive, HDD), a solid-state drive (solid-state drive, SSD), a cloud storage (cloud storage), a network attached storage (NAS: network attached Storage), or a network drive (network drive). The memory may alternatively include a combination of memories of the foregoing types, or another medium or product in any form that has a storage function.

The program product may be any combination of one or more readable media. The readable medium may be a readable signal medium or a readable storage medium. For example, the readable storage medium may be, but is not limited to, an electrical, magnetic, optical, electromagnetic, infrared, or semiconductor system, apparatus or device, or any combination thereof. More specific examples (non-exhaustive list) of the readable storage medium include an electrical connection having one or more conducting wires, a portable disk, a hard disk drive, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any appropriate combination thereof.

A program product for configuring parameters in an implementation of this application may use a portable compact disc read-only memory (CD-ROM) and include program code, and may run on a server device. However, the program product in this application is not limited thereto. In this specification, the readable storage medium may be any tangible medium that includes or stores a program, and the program can be transmitted as information and used by an apparatus or a component or used in combination with an apparatus or a component.

The readable signal medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted by using any appropriate medium, including but not limited to a wireless medium, a wired medium, an optical cable, an RF, or any appropriate combination thereof.

The program code used to execute the operations of this application may be written in any combination of one or more program design languages. The program design languages include object-oriented program design languages such as Java and C++, and further include a conventional procedural program design language such as a "C" language or a similar program design language. The program code may be all executed on a computing device of a user, partially executed on user equipment, executed as an independent software package, partially executed on a computing device of a user and partially executed on a remote computing device, or all executed on a remote computing device or server. When the program code is executed on the remote computing device, the remote computing device may be connected to the computing device of the user by using any type of network, including a local area network (LAN) or a wide area network (WAN), or may be connected to an external computing device.

An embodiment of this application further provides a computer device-readable storage medium for the signal transmission method based on satellite communication, so that content is not lost after power failure. The storage medium stores a software program including program code. When the program code is run on a computing device, any one of the foregoing signal transmission solutions based on satellite communication in the embodiments of this application can be implemented when the software program is read and executed by one or more processors.

The foregoing describes this application with reference to the block diagrams and/or flowcharts of the method, the apparatus (system), and/or the computer program product in the embodiments of this application. It should be understood that a block of the block diagrams and/or flowcharts and a combination of blocks in the block diagrams and/or flowcharts, can be implemented by using computer program instructions. These computer program instructions may be provided to a processor of a general-purpose computer, a processor of a special-purpose computer, and/or another programmable data processing apparatus to produce a machine, so that the instructions executed by the processor of the computer and/or the another programmable data processing apparatus create a method for implementing a specific function/action in a block in the flowcharts and/or block diagrams.

Correspondingly, this application may further be implemented by using hardware and/or software (including firmware, resident software, microcode, and the like). Still further, this application may be in a form of a computer program product on a computer-usable or computer-readable storage medium. The computer program product has computer-usable or computer-readable program code implemented in the medium, for used by an instruction execution system or used in combination with an instruction execution system. In the context of this application, the computer-usable or computer-readable medium may be any medium, and may include, store, communicate, transmit, or transfer a program, for use by an instruction execution system, apparatus, or device or used in combination with an instruction execution system, apparatus, or device.

Although this application is described with reference to specific features and the embodiments thereof, clearly, various modifications and combinations may be made to them without departing from the spirit and scope of this application. Correspondingly, the specification and accompanying drawings are merely example descriptions of this application defined by the appended claims, and is considered as any of or all modifications, variations, combinations or equivalents that cover the scope of this application. Clearly, a person skilled in the art may make various modifications and variations to this application without departing from the scope of this application. This application is intended to cover these modifications and variations of this application provided that they fall within the scope of the claims of this application and their equivalent technologies.

What is claimed is:

1. A signal transmission method based on satellite communication, comprising:
    obtaining, by a communications device, carrier attribute information corresponding to a target carrier used to transmit an orthogonal frequency division multiplexing (OFDM) symbol, wherein the carrier attribute information of the target carrier comprises subcarrier spacing;
    determining, by the communications device, a cyclic prefix (CP) length of the OFDM symbol based on the carrier attribute information corresponding to the target carrier and a preset correspondence between the carrier attribute information and the OFDM symbol, wherein a CP is used to carry first data, and the first data is data in the OFDM symbol; and
    determining, by the communications device, a cyclic suffix (CS) length of the OFDM symbol based on the carrier attribute information corresponding to the target carrier and a preset correspondence between the carrier attribute information and the CS length, wherein the CS length is at least one of a part of the CP length or a length of a part of the data in the OFDM symbol.

2. The method according to claim 1, wherein the carrier attribute information further comprises one or more of a beam identifier and a beam elevation angle of a beam in which the target carrier is located.

3. The method according to claim 2, wherein the preset correspondence between the carrier attribute information and the OFDM symbol comprises a correspondence between subcarrier spacing and the CP length.

4. The method according to claim 2, wherein the preset correspondence between the carrier attribute information and the OFDM symbol further comprises:
    a correspondence between subcarrier spacing and each of a CP length and a CS length; or
    a correspondence between each of subcarrier spacing and a beam identifier, and each of a CP length and a CS length; or
    a correspondence between each of subcarrier spacing and a beam elevation angle, and each of a CP length and a CS length; or a correspondence between each of subcarrier spacing, a beam identifier, and a beam elevation angle, and each of a CP length and a CS length.

5. The method according to claim 1, wherein the CP is further used to carry second data, and the second data is data different from the OFDM symbol.

6. A communications device, comprising:
at least one processor; and
one or more memories coupled to the at least one processor and storing program instructions for execution by the at least one processor to:
obtain carrier attribute information corresponding to a target carrier used to transmit an orthogonal frequency division multiplexing (OFDM) symbol, wherein the carrier attribute information of the target carrier comprises subcarrier spacing;
determine a cyclic prefix (CP) length of the OFDM symbol based on the carrier attribute information corresponding to the target carrier and a preset correspondence between the carrier attribute information and the OFDM symbol, wherein a CP is used to carry first data, and the first data is data in the OFDM symbol; and
determine a cyclic suffix (CS) length of the OFDM symbol based on the carrier attribute information corresponding to the target carrier and a preset correspondence between the carrier attribute information and a CS length, wherein the CS length is at least one of a part of the CP length or a length of a part of the data in the OFDM symbol.

7. The communications device according to claim 6, wherein the carrier attribute information further comprises one or more of a beam identifier and a beam elevation angle of a beam in which the target carrier is located.

8. The communications device according to claim 7, wherein the preset correspondence between the carrier attribute information and the OFDM symbol comprises a correspondence between subcarrier spacing and the CP length.

9. The communications device according to claim 7, wherein the preset correspondence between the carrier attribute information and the OFDM symbol further comprises:
a correspondence between subcarrier spacing and each of a CP length and a CS length; or
a correspondence between each of subcarrier spacing and a beam identifier, and each of a CP length and a CS length; or
a correspondence between each of subcarrier spacing and a beam elevation angle, and each of a CP length and a CS length; or
a correspondence between each of subcarrier spacing, a beam identifier, and a beam elevation angle, and each of a CP length and a CS length.

10. The communications device according to claim 6, wherein the CP is further used to carry second data, and the second data is data different from the OFDM symbol.

11. A non-transitory computer readable storage medium, wherein the non-transitory computer readable storage medium stores program instructions for execution by at least one processor to:
obtain carrier attribute information corresponding to a target carrier used to transmit an orthogonal frequency division multiplexing (OFDM) symbol, wherein the carrier attribute information of the target carrier comprises subcarrier spacing;
determine a cyclic prefix (CP) length of the OFDM symbol based on the carrier attribute information corresponding to the target carrier and a preset correspondence between the carrier attribute information and the OFDM symbol, wherein a CP is used to carry first data, and the first data is data in the OFDM symbol; and
determine a cyclic suffix (CS) length of the OFDM symbol based on the carrier attribute information corresponding to the target carrier and a preset correspondence between the carrier attribute information and a CS length, wherein the CS length is at least one of a part of the CP length or a length of a part of the data in the OFDM symbol.

12. The non-transitory computer readable storage medium according to claim 11, wherein the carrier attribute information further comprises one or more of a beam identifier and a beam elevation angle of a beam in which the target carrier is located.

13. The non-transitory computer readable storage medium according to claim 12, wherein the preset correspondence between the carrier attribute information and the OFDM symbol comprises a correspondence between subcarrier spacing and the CP length.

14. The non-transitory computer readable storage medium according to claim 12, wherein the preset correspondence between the carrier attribute information and the OFDM symbol further comprises:
a correspondence between subcarrier spacing and each of a CP length and a CS length; or
a correspondence between each of subcarrier spacing and a beam identifier, and each of a CP length and a CS length; or
a correspondence between each of subcarrier spacing and a beam elevation angle, and each of a CP length and a CS length; or
a correspondence between each of subcarrier spacing, a beam identifier, and a beam elevation angle, and each of a CP length and a CS length.

15. The non-transitory computer readable storage medium according to claim 11, wherein the CP is further used to carry second data, and the second data is data different from the OFDM symbol.

* * * * *

UNITED STATES PATENT AND TRADEMARK OFFICE
CERTIFICATE OF CORRECTION

| | | |
|---|---|---|
| PATENT NO. | : 12,119,972 B2 | Page 1 of 1 |
| APPLICATION NO. | : 17/706291 | |
| DATED | : October 15, 2024 | |
| INVENTOR(S) | : Jianwei Zhou et al. | |

It is certified that error appears in the above-identified patent and that said Letters Patent is hereby corrected as shown below:

On the Title Page

In Column 2 Item (57) (Abstract), In Line 3, Delete "includes:" and insert -- includes --.

Signed and Sealed this
Eleventh Day of February, 2025

Coke Morgan Stewart
*Acting Director of the United States Patent and Trademark Office*